United States Patent
Symington et al.

(10) Patent No.: US 9,739,122 B2
(45) Date of Patent: Aug. 22, 2017

(54) MITIGATING THE EFFECTS OF SUBSURFACE SHUNTS DURING BULK HEATING OF A SUBSURFACE FORMATION

(71) Applicants: William A. Symington, Houston, TX (US); Robert D. Kaminsky, Houston, TX (US)

(72) Inventors: William A. Symington, Houston, TX (US); Robert D. Kaminsky, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 14/884,270

(22) Filed: Oct. 15, 2015

(65) Prior Publication Data

US 2016/0145986 A1    May 26, 2016

Related U.S. Application Data

(60) Provisional application No. 62/082,943, filed on Nov. 21, 2014, provisional application No. 62/082,948, filed on Nov. 21, 2014.

(51) Int. Cl.
*E21B 43/24*    (2006.01)
*E21B 36/04*    (2006.01)
(Continued)

(52) U.S. Cl.
CPC .......... *E21B 43/2401* (2013.01); *E21B 36/04* (2013.01); *E21B 43/2405* (2013.01);
(Continued)

(58) Field of Classification Search
None
See application file for complete search history.

(56) References Cited

U.S. PATENT DOCUMENTS

| | | |
|---|---|---|
| 363,419 A | 5/1887 | Poetsch |
| 895,612 A | 8/1908 | Baker |

(Continued)

FOREIGN PATENT DOCUMENTS

| | | |
|---|---|---|
| CA | 994694 | 8/1976 |
| CA | 1288043 | 8/1991 |

(Continued)

OTHER PUBLICATIONS

Bridges, J. et al., "Radio-Frequency Heating to Recover Oil from Tar Sands," The Future of Heavy Crude Oils and Tar Sands, pp. 396-409 (Dec. 31, 1979).

(Continued)

*Primary Examiner* — Anuradha Ahuja
(74) *Attorney, Agent, or Firm* — ExxonMobil Upstream Research Company Law Department

(57) ABSTRACT

Systems and methods for mitigating the effects of subsurface shunts during bulk heating of a subsurface formation are disclosed. The methods may include electrically connecting, and concurrently applying, first, second, and third alternating voltages to respective first, second, and third electrode assemblies within the subsurface formation. The first, second, and third alternating voltages may have the same frequency and respective first, second, and third phase angles. The second phase angle may be different than the first phase angle, and the third phase angle may be different than the second phase angle. The methods may include, upon determining a presence of a subsurface shunt between the first electrode assembly and the second electrode assembly, electrically connecting the first electrode assembly to the second alternating voltage and applying the second alternating voltage to the first and second electrode assemblies while applying the third alternating voltage to the third electrode assembly.

18 Claims, 6 Drawing Sheets

(51) Int. Cl.
   *E21B 47/00*  (2012.01)
   *E21B 43/26*  (2006.01)
   *G01V 3/02*   (2006.01)
(52) U.S. Cl.
   CPC .............. *E21B 43/26* (2013.01); *E21B 47/00* (2013.01); *G01V 3/02* (2013.01)

(56) References Cited

U.S. PATENT DOCUMENTS

| | | |
|---|---|---|
| 1,342,780 A | 6/1920 | Vedder |
| 1,422,204 A | 7/1922 | Hoover et al. |
| 1,666,488 A | 4/1928 | Crawshaw |
| 1,701,884 A | 2/1929 | Hogle |
| 1,872,906 A | 8/1932 | Doherty |
| 2,033,560 A | 3/1936 | Wells |
| 2,033,561 A | 3/1936 | Wells |
| 2,534,737 A | 12/1950 | Rose |
| 2,584,605 A | 2/1952 | Merriam et al. |
| 2,634,961 A | 4/1953 | Ljungstrom |
| 2,732,195 A | 1/1956 | Ljungstrom |
| 2,777,679 A | 1/1957 | Ljungstrom |
| 2,780,450 A | 2/1957 | Ljungstrom |
| 2,795,279 A | 6/1957 | Sarapuu |
| 2,812,160 A | 11/1957 | West et al. |
| 2,813,583 A | 11/1957 | Marx et al. |
| 2,847,071 A | 8/1958 | De Priester |
| 2,887,160 A | 5/1959 | De Priester. |
| 2,895,555 A | 7/1959 | De Priester |
| 2,923,535 A | 2/1960 | Ljungstrom |
| 2,944,803 A | 7/1960 | Hanson |
| 2,952,450 A | 9/1960 | Purre |
| 2,974,937 A | 3/1961 | Kiel |
| 3,004,601 A | 10/1961 | Bodine |
| 3,013,609 A | 12/1961 | Brink |
| 3,095,031 A | 6/1963 | Eurenius et al. |
| 3,106,244 A | 10/1963 | Parker |
| 3,109,482 A | 11/1963 | O'Brien |
| 3,127,936 A | 4/1964 | Eurenius |
| 3,137,347 A | 6/1964 | Parker |
| 3,149,672 A | 9/1964 | Orkiszewski et al. |
| 3,170,815 A | 2/1965 | White |
| 3,180,411 A | 4/1965 | Parker |
| 3,183,675 A | 5/1965 | Schroeder |
| 3,183,971 A | 5/1965 | McEver et al. |
| 3,194,315 A | 7/1965 | Rogers |
| 3,205,942 A | 9/1965 | Sandberg |
| 3,225,829 A | 12/1965 | Chown et al. |
| 3,228,869 A | 1/1966 | Irish |
| 3,241,611 A | 3/1966 | Dougan |
| 3,241,615 A | 3/1966 | Brandt et al. |
| 3,254,721 A | 6/1966 | Smith et al. |
| 3,256,935 A | 6/1966 | Nabor et al. |
| 3,263,211 A | 7/1966 | Heidman |
| 3,267,680 A | 8/1966 | Schlumberger |
| 3,271,962 A | 9/1966 | Dahms et al. |
| 3,284,281 A | 11/1966 | Thomas |
| 3,285,335 A | 11/1966 | Reistle, Jr. |
| 3,288,648 A | 11/1966 | Jones |
| 3,294,167 A | 12/1966 | Vogel |
| 3,295,328 A | 1/1967 | Bishop |
| 3,323,840 A | 6/1967 | Mason et al. |
| 3,358,756 A | 12/1967 | Vogel |
| 3,372,550 A | 3/1968 | Schroeder |
| 3,376,403 A | 4/1968 | Mircea |
| 3,382,922 A | 5/1968 | Needham |
| 3,400,762 A | 9/1968 | Peacock et al. |
| 3,436,919 A | 4/1969 | Shock et al. |
| 3,439,744 A | 4/1969 | Bradley |
| 3,455,392 A | 7/1969 | Prats |
| 3,461,957 A | 8/1969 | West |
| 3,468,376 A | 9/1969 | Slusser et al. |
| 3,494,640 A | 2/1970 | Coberly et al. |
| 3,500,913 A | 3/1970 | Nordgren et al. |
| 3,501,201 A | 3/1970 | Closmann et al. |
| 3,502,372 A | 3/1970 | Prats |
| 3,503,446 A * | 3/1970 | Brandon ............... E21B 43/003 162/168.1 |
| 3,513,914 A | 5/1970 | Vogel |
| 3,515,213 A | 6/1970 | Prats |
| 3,516,495 A | 6/1970 | Patton |
| 3,521,709 A | 7/1970 | Needham |
| 3,528,252 A | 9/1970 | Gail |
| 3,528,501 A | 9/1970 | Parker |
| 3,547,193 A | 12/1970 | Gill |
| 3,559,737 A | 2/1971 | Ralstin |
| 3,572,838 A | 3/1971 | Templeton |
| 3,592,263 A | 7/1971 | Nelson |
| 3,599,714 A | 8/1971 | Messman |
| 3,602,310 A | 8/1971 | Halbert |
| 3,613,785 A | 10/1971 | Closmann et al. |
| 3,620,300 A | 11/1971 | Crowson |
| 3,642,066 A * | 2/1972 | Gill ..................... E21B 43/2401 166/248 |
| 3,661,423 A | 5/1972 | Garret |
| 3,692,111 A | 9/1972 | Breithaupt et al. |
| 3,695,354 A | 10/1972 | Dilgren et al. |
| 3,700,280 A | 10/1972 | Papadopoulos et al. |
| 3,724,225 A | 4/1973 | Mancini et al. |
| 3,724,543 A | 4/1973 | Bell et al. |
| 3,729,965 A | 5/1973 | Gartner |
| 3,730,270 A | 5/1973 | Allred |
| 3,739,851 A | 6/1973 | Beard |
| 3,741,306 A | 6/1973 | Papadopoulos et al. |
| 3,759,328 A | 9/1973 | Ueber et al. |
| 3,759,329 A | 9/1973 | Ross |
| 3,759,574 A | 9/1973 | Beard |
| 3,779,601 A | 12/1973 | Beard |
| 3,880,238 A | 4/1975 | Tham et al. |
| 3,882,937 A | 5/1975 | Robinson |
| 3,882,941 A | 5/1975 | Pelofsky |
| 3,888,307 A | 6/1975 | Closmann |
| 3,924,680 A | 12/1975 | Terry |
| 3,943,722 A | 3/1976 | Ross |
| 3,948,319 A | 4/1976 | Pritchett |
| 3,950,029 A | 4/1976 | Timmins |
| 3,958,636 A | 5/1976 | Perkins |
| 3,967,853 A | 7/1976 | Closmann et al. |
| 3,978,920 A | 9/1976 | Badyopadhyay |
| 3,999,607 A | 12/1976 | Pennington et al. |
| 4,003,432 A | 1/1977 | Paull et al. |
| 4,005,750 A | 2/1977 | Shuck |
| 4,007,786 A | 2/1977 | Schlinger |
| 4,008,762 A | 2/1977 | Fisher et al. |
| 4,008,769 A | 2/1977 | Chang |
| 4,014,575 A | 3/1977 | French et al. |
| 4,030,549 A | 6/1977 | Bouck |
| 4,037,655 A | 7/1977 | Carpenter |
| 4,043,393 A | 8/1977 | Fisher et al. |
| 4,047,760 A | 9/1977 | Ridley |
| 4,057,510 A | 11/1977 | Crouch et al. |
| 4,065,183 A | 12/1977 | Hill et al. |
| 4,067,390 A | 1/1978 | Camacho et al. |
| 4,069,868 A | 1/1978 | Terry |
| 4,071,278 A | 1/1978 | Carpenter et al. |
| 4,093,025 A | 6/1978 | Terry |
| 4,096,034 A | 6/1978 | Anthony |
| 4,125,159 A | 11/1978 | Vann |
| 4,140,180 A * | 2/1979 | Bridges .................. E21B 36/04 166/245 |
| 4,148,359 A | 4/1979 | Laumbach et al. |
| 4,149,595 A | 4/1979 | Cha |
| 4,160,479 A | 7/1979 | Richardson et al. |
| 4,163,475 A | 8/1979 | Cha et al. |
| 4,167,291 A | 9/1979 | Ridley |
| 4,169,506 A | 10/1979 | Berry |
| 4,185,693 A | 1/1980 | Crumb et al. |
| 4,186,801 A | 2/1980 | Madgavkar et al. |
| 4,193,451 A | 3/1980 | Dauphine |
| 4,202,168 A | 5/1980 | Acheson et al. |
| 4,239,283 A | 12/1980 | Ridley |
| 4,241,952 A | 12/1980 | Ginsburgh |
| 4,246,966 A | 1/1981 | Stoddard et al. |
| 4,250,230 A | 2/1981 | Terry |
| 4,265,310 A | 5/1981 | Britton et al. |

(56) References Cited

U.S. PATENT DOCUMENTS

| | | |
|---|---|---|
| 4,271,905 A | 6/1981 | Redford et al. |
| 4,272,127 A | 6/1981 | Hutchins |
| 4,285,401 A | 8/1981 | Erickson |
| RE30,738 E * | 9/1981 | Bridges .................. E21B 36/04 166/245 |
| 4,318,723 A | 3/1982 | Holmes et al. |
| 4,319,635 A | 3/1982 | Jones |
| 4,320,801 A | 3/1982 | Rowland et al. |
| 4,324,291 A | 4/1982 | Wong et al. |
| 4,340,934 A | 7/1982 | Segesman |
| 4,344,485 A | 8/1982 | Butler |
| 4,344,840 A | 8/1982 | Kunesh |
| 4,353,418 A | 10/1982 | Hoekstra et al. |
| 4,358,222 A | 11/1982 | Landau |
| 4,362,213 A | 12/1982 | Tabor |
| 4,368,921 A | 1/1983 | Hutchins |
| 4,369,842 A | 1/1983 | Cha |
| 4,372,615 A | 2/1983 | Ricketts |
| 4,375,302 A | 3/1983 | Kalmar |
| 4,384,614 A | 5/1983 | Justheim |
| 4,396,211 A | 8/1983 | McStravick et al. |
| 4,397,502 A | 8/1983 | Hines |
| 4,401,162 A | 8/1983 | Osborne |
| 4,412,585 A | 11/1983 | Bouck |
| 4,417,449 A | 11/1983 | Hegarty et al. |
| 4,449,585 A | 5/1984 | Bridges et al. |
| 4,468,376 A | 8/1984 | Suggitt |
| 4,470,459 A * | 9/1984 | Copland .................. E21B 36/04 166/248 |
| 4,472,935 A | 9/1984 | Acheson et al. |
| 4,473,114 A | 9/1984 | Bell et al. |
| 4,474,238 A | 10/1984 | Gentry et al. |
| 4,476,926 A | 10/1984 | Bridges et al. |
| 4,483,398 A | 11/1984 | Peters et al. |
| 4,485,869 A | 12/1984 | Sresty et al. |
| 4,487,257 A | 12/1984 | Dauphine |
| 4,487,260 A | 12/1984 | Pittman et al. |
| 4,495,056 A | 1/1985 | Venardos |
| 4,511,382 A | 4/1985 | Valencia et al. |
| 4,532,991 A | 8/1985 | Hoekstra et al. |
| 4,533,372 A | 8/1985 | Valencia et al. |
| 4,537,067 A | 8/1985 | Sharp et al. |
| 4,545,435 A | 10/1985 | Bridges et al. |
| 4,546,829 A | 10/1985 | Martin et al. |
| 4,550,779 A | 11/1985 | Zakiewicz |
| 4,552,214 A | 11/1985 | Forgac et al. |
| 4,567,945 A | 2/1986 | Segalman |
| 4,585,063 A | 4/1986 | Venardos et al. |
| 4,589,491 A | 5/1986 | Perkins |
| 4,589,973 A | 5/1986 | Minden |
| 4,602,144 A | 7/1986 | Vogel |
| 4,607,488 A | 8/1986 | Karinthi et al. |
| 4,626,665 A | 12/1986 | Fort |
| 4,633,948 A | 1/1987 | Closmann |
| 4,634,315 A | 1/1987 | Owen et al. |
| 4,637,464 A | 1/1987 | Forgac et al. |
| 4,640,352 A | 2/1987 | Vanmeurs et al. |
| 4,671,863 A | 6/1987 | Tejeda |
| 4,694,907 A | 9/1987 | Stahl et al. |
| 4,704,514 A | 11/1987 | Van Egmond et al. |
| 4,705,108 A | 11/1987 | Little et al. |
| 4,706,751 A | 11/1987 | Gonduin |
| 4,730,671 A | 3/1988 | Perkins |
| 4,737,267 A | 4/1988 | Pao et al. |
| 4,747,642 A | 5/1988 | Gash et al. |
| 4,754,808 A | 7/1988 | Harmon et al. |
| 4,776,638 A | 10/1988 | Hahn |
| 4,779,680 A | 10/1988 | Sydansk |
| 4,815,790 A | 3/1989 | Rosar et al. |
| 4,817,711 A | 4/1989 | Jeambey |
| 4,828,031 A | 5/1989 | Davis |
| 4,860,544 A | 8/1989 | Krieg et al. |
| 4,886,118 A | 12/1989 | Van Meurs et al. |
| 4,923,493 A | 5/1990 | Valencia et al. |
| 4,926,941 A | 5/1990 | Glandt et al. |
| 4,928,765 A | 5/1990 | Nielson |
| 4,929,341 A | 5/1990 | Thirumalachar et al. |
| 4,954,140 A | 9/1990 | Kawashima et al. |
| 4,974,425 A | 12/1990 | Krieg et al. |
| 5,016,709 A | 5/1991 | Combe et al. |
| 5,036,918 A | 8/1991 | Jennings et al. |
| 5,042,579 A | 8/1991 | Glandt et al. |
| 5,050,386 A | 9/1991 | Krieg et al. |
| 5,051,811 A | 9/1991 | Williams et al. |
| 5,055,030 A | 10/1991 | Schirmer |
| 5,055,180 A | 10/1991 | Klaila |
| 5,082,055 A | 1/1992 | Hemsath |
| 5,085,276 A | 2/1992 | Rivas et al. |
| 5,117,908 A | 6/1992 | Hofmann |
| 5,120,338 A | 6/1992 | Potts, Jr. et al. |
| 5,217,076 A | 6/1993 | Masek |
| 5,236,039 A | 8/1993 | Edelstein |
| 5,255,742 A | 10/1993 | Mikus |
| 5,275,063 A | 1/1994 | Steiger et al. |
| 5,277,062 A | 1/1994 | Blauch et al. |
| 5,297,420 A | 3/1994 | Gilliland et al. |
| 5,297,626 A | 3/1994 | Vinegar et al. |
| 5,305,829 A | 4/1994 | Kumar |
| 5,325,918 A | 7/1994 | Berryman et al. |
| 5,346,307 A | 9/1994 | Ramirez et al. |
| 5,372,708 A | 12/1994 | Gewertz |
| 5,377,756 A | 1/1995 | Northrop et al. |
| 5,392,854 A | 2/1995 | Vinegar et al. |
| 5,411,089 A | 5/1995 | Vinegar et al. |
| 5,416,257 A | 5/1995 | Peters |
| 5,539,853 A | 7/1996 | Jamaluddin et al. |
| 5,620,049 A | 4/1997 | Gipson et al. |
| 5,621,844 A | 4/1997 | Bridges |
| 5,621,845 A | 4/1997 | Bridges et al. |
| 5,635,712 A | 6/1997 | Scott et al. |
| 5,661,977 A | 9/1997 | Shnell |
| 5,724,805 A | 3/1998 | Golomb et al. |
| 5,730,550 A | 3/1998 | Andersland et al. |
| 5,751,895 A * | 5/1998 | Bridges .................. E21B 47/122 392/306 |
| 5,753,010 A | 5/1998 | Sircar |
| 5,838,634 A | 11/1998 | Jones et al. |
| 5,844,799 A | 12/1998 | Joseph et al. |
| 5,868,202 A | 2/1999 | Hsu |
| 5,899,269 A | 5/1999 | Wellington et al. |
| 5,905,657 A | 5/1999 | Celniker |
| 5,907,662 A | 5/1999 | Buettner et al. |
| 5,938,800 A | 8/1999 | Verrill et al. |
| 5,956,971 A | 9/1999 | Cole et al. |
| 6,015,015 A | 1/2000 | Luft et al. |
| 6,016,867 A | 1/2000 | Gregoli et al. |
| 6,023,554 A | 2/2000 | Vinegar et al. |
| 6,055,803 A | 5/2000 | Mastronarde |
| 6,056,057 A | 5/2000 | Vinegar et al. |
| 6,079,499 A | 6/2000 | Mikus et al. |
| 6,112,808 A * | 9/2000 | Isted .................. E21B 28/00 166/248 |
| 6,148,602 A | 11/2000 | Demetri |
| 6,148,911 A | 11/2000 | Gipson et al. |
| 6,158,517 A | 12/2000 | Hsu |
| 6,199,634 B1 | 3/2001 | Selyakov |
| 6,246,963 B1 | 6/2001 | Cross et al. |
| 6,247,358 B1 | 6/2001 | Dos Santos |
| 6,319,395 B1 | 11/2001 | Kirkbride et al. |
| 6,328,104 B1 | 12/2001 | Graue |
| 6,409,226 B1 | 6/2002 | Slack et al. |
| 6,434,435 B1 | 8/2002 | Tubel et al. |
| 6,434,436 B1 | 8/2002 | Adamy et al. |
| 6,480,790 B1 | 11/2002 | Calvert et al. |
| 6,499,536 B1 * | 12/2002 | Ellingsen .................. E21B 43/003 166/248 |
| 6,540,018 B1 | 4/2003 | Vinegar et al. |
| 6,547,956 B1 | 4/2003 | Mukherjee et al. |
| 6,581,684 B2 | 6/2003 | Wellington et al. |
| 6,585,046 B2 | 7/2003 | Neuroth et al. |
| 6,589,303 B1 | 7/2003 | Lokhandwale et al. |
| 6,591,906 B2 | 7/2003 | Wellington et al. |
| 6,596,142 B2 * | 7/2003 | McGee .................. B09C 1/06 204/515 |

(56) References Cited

U.S. PATENT DOCUMENTS

| | | |
|---|---|---|
| 6,607,036 B2 | 8/2003 | Ranson et al. |
| 6,609,735 B1 | 8/2003 | DeLange et al. |
| 6,609,761 B1 | 8/2003 | Ramey et al. |
| 6,659,650 B2 | 12/2003 | Joki et al. |
| 6,659,690 B1 | 12/2003 | Abadi |
| 6,668,922 B2 | 12/2003 | Ziauddin et al. |
| 6,684,644 B2 | 2/2004 | Mittricker et al. |
| 6,684,948 B1 | 2/2004 | Savage |
| 6,708,758 B2 | 3/2004 | de Rouffignac et al. |
| 6,709,573 B2 | 3/2004 | Smith |
| 6,712,136 B2 | 3/2004 | de Rouffignac et al. |
| 6,715,546 B2 | 4/2004 | Vinegar et al. |
| 6,722,429 B2 | 4/2004 | de Rouffignac et al. |
| 6,740,226 B2 | 5/2004 | Mehra et al. |
| 6,742,588 B2 | 6/2004 | Wellington et al. |
| 6,745,831 B2 | 6/2004 | De Rouffignac et al. |
| 6,745,832 B2 | 6/2004 | Wellington et al. |
| 6,745,837 B2 | 6/2004 | Wellington et al. |
| 6,752,210 B2 | 6/2004 | de Rouffignac et al. |
| 6,754,588 B2 | 6/2004 | Cross et al. |
| 6,764,108 B2 | 7/2004 | Ernst et al. |
| 6,782,947 B2 | 8/2004 | de Rouffignac et al. |
| 6,796,139 B2 | 9/2004 | Briley et al. |
| 6,820,689 B2 | 11/2004 | Sarada |
| 6,832,485 B2 | 12/2004 | Surgarmen et al. |
| 6,854,929 B2 | 2/2005 | Vinegar et al. |
| 6,858,049 B2 | 2/2005 | Mittricker |
| 6,877,555 B2 | 4/2005 | Karanikas et al. |
| 6,880,633 B2 | 4/2005 | Wellington et al. |
| 6,887,369 B2 | 5/2005 | Moulton et al. |
| 6,896,053 B2 | 5/2005 | Berchenko et al. |
| 6,896,707 B2 | 5/2005 | O'Rear et al. |
| 6,913,078 B2 | 7/2005 | Shahin et al. |
| 6,915,850 B2 | 7/2005 | Vinegar et al. |
| 6,918,442 B2 | 7/2005 | Wellington et al. |
| 6,918,443 B2 | 7/2005 | Wellington et al. |
| 6,918,444 B2 | 7/2005 | Passey et al. |
| 6,923,257 B2 | 8/2005 | Wellington et al. |
| 6,923,258 B2 | 8/2005 | Wellington et al. |
| 6,929,067 B2 | 8/2005 | Vinegar et al. |
| 6,932,155 B2 | 8/2005 | Vinegar et al. |
| 6,948,562 B2 | 9/2005 | Wellington et al. |
| 6,951,247 B2 | 10/2005 | De Rouffignac et al. |
| 6,953,087 B2 | 10/2005 | de Rouffignac et al. |
| 6,964,300 B2 | 11/2005 | Vinegar et al. |
| 6,969,123 B2 | 11/2005 | Vinegar et al. |
| 6,988,549 B1 | 1/2006 | Babcock |
| 6,991,032 B2 | 1/2006 | Berchenko et al. |
| 6,991,033 B2 | 1/2006 | Wellington et al. |
| 6,994,160 B2 | 2/2006 | Wellington et al. |
| 6,994,169 B2 | 2/2006 | Zhang et al. |
| 6,997,518 B2 | 2/2006 | Vinegar et al. |
| 7,001,519 B2 | 2/2006 | Linden et al. |
| 7,004,247 B2 | 2/2006 | Cole et al. |
| 7,004,251 B2 | 2/2006 | Ward et al. |
| 7,004,985 B2 | 2/2006 | Wallace et al. |
| 7,011,154 B2 | 3/2006 | Maher et al. |
| 7,013,972 B2 | 3/2006 | Vinegar et al. |
| 7,028,543 B2 | 4/2006 | Hardage et al. |
| 7,032,660 B2 | 4/2006 | Vinegar et al. |
| 7,036,583 B2 | 5/2006 | de Rouffignac et al. |
| 7,040,397 B2 | 5/2006 | Rouffignac et al. |
| 7,040,399 B2 | 5/2006 | Wellington et al. |
| 7,043,920 B2 | 5/2006 | Viteri et al. |
| 7,048,051 B2 | 5/2006 | McQueen |
| 7,051,807 B2 | 5/2006 | Vinegar et al. |
| 7,051,811 B2 | 5/2006 | Rouffignac et al. |
| 7,055,600 B2 | 6/2006 | Messier et al. |
| 7,063,145 B2 | 6/2006 | Veenstra et al. |
| 7,066,254 B2 | 6/2006 | Vinegar et al. |
| 7,073,578 B2 | 7/2006 | Vinegar et al. |
| 7,077,198 B2 | 7/2006 | Vinegar et al. |
| 7,077,199 B2 | 7/2006 | Vinegar et al. |
| 7,090,013 B2 | 8/2006 | Wellington |
| 7,093,655 B2 | 8/2006 | Atkinson |
| 7,096,942 B1 | 8/2006 | de Rouffignac et al. |
| 7,096,953 B2 | 8/2006 | de Rouffignac et al. |
| 7,100,994 B2 | 9/2006 | Vinegar et al. |
| 7,103,479 B2 | 9/2006 | Patwardhan et al. |
| 7,104,319 B2 | 9/2006 | Vinegar et al. |
| 7,121,341 B2 | 10/2006 | Vinegar et al. |
| 7,121,342 B2 | 10/2006 | Vinegar et al. |
| 7,124,029 B2 | 10/2006 | Jammes et al. |
| 7,143,572 B2 | 12/2006 | Ooka et al. |
| 7,165,615 B2 | 1/2007 | Vinegar et al. |
| 7,181,380 B2 | 2/2007 | Dusterhoft et al. |
| 7,198,107 B2 | 4/2007 | Maguire |
| 7,219,734 B2 | 5/2007 | Bai et al. |
| 7,225,866 B2 | 6/2007 | Berchenko et al. |
| 7,243,618 B2 | 7/2007 | Gurevich |
| 7,255,727 B2 | 8/2007 | Monereau et al. |
| 7,322,415 B2 | 1/2008 | de St. Remey |
| 7,331,385 B2 | 2/2008 | Symington et al. |
| 7,353,872 B2 | 4/2008 | Sandberg |
| 7,357,180 B2 | 4/2008 | Vinegar et al. |
| 7,405,243 B2 | 7/2008 | Lowe et al. |
| 7,441,603 B2 | 10/2008 | Kaminsky et al. |
| 7,461,691 B2 | 12/2008 | Vinegar et al. |
| 7,472,748 B2 | 1/2009 | Gdanski et al. |
| 7,484,561 B2 | 2/2009 | Bridges |
| 7,516,785 B2 | 4/2009 | Kaminsky |
| 7,516,786 B2 | 4/2009 | Dallas et al. |
| 7,516,787 B2 | 4/2009 | Kaminsky |
| 7,546,873 B2 | 6/2009 | Kim et al. |
| 7,549,470 B2 | 6/2009 | Vinegar et al. |
| 7,556,095 B2 | 7/2009 | Vinegar |
| 7,591,879 B2 | 9/2009 | Sundaram et al. |
| 7,604,054 B2 | 10/2009 | Hocking |
| 7,617,869 B2 | 11/2009 | Carney |
| 7,631,691 B2 | 12/2009 | Symington et al. |
| 7,637,984 B2 | 12/2009 | Adamopoulos |
| 7,644,993 B2 | 1/2010 | Kaminsky et al. |
| 7,647,971 B2 | 1/2010 | Kaminsky |
| 7,647,972 B2 | 1/2010 | Kaminsky |
| 7,654,320 B2 | 2/2010 | Payton |
| 7,669,657 B2 | 3/2010 | Symington et al. |
| 7,743,826 B2 | 6/2010 | Harris et al. |
| 7,798,221 B2 | 9/2010 | Vinegar et al. |
| 7,832,483 B2 | 11/2010 | Trent |
| 7,857,056 B2 | 12/2010 | Kaminsky et al. |
| 7,860,377 B2 | 12/2010 | Vinegar et al. |
| 7,905,288 B2 | 3/2011 | Kinkead |
| 7,980,312 B1 | 7/2011 | Hill et al. |
| 8,087,460 B2 | 1/2012 | Kaminsky |
| 8,127,865 B2 | 3/2012 | Watson et al. |
| 8,176,982 B2 | 5/2012 | Gil et al. |
| 8,356,935 B2 | 1/2013 | Arora et al. |
| 8,540,020 B2 | 9/2013 | Stone et al. |
| 8,596,355 B2 | 12/2013 | Kaminsky et al. |
| 8,608,249 B2 | 12/2013 | Vinegar et al. |
| 8,616,280 B2 | 12/2013 | Kaminsky et al. |
| 8,622,127 B2 | 1/2014 | Kaminsky |
| 8,662,175 B2 | 3/2014 | Karanikas et al. |
| 8,763,691 B2 * | 7/2014 | Parsche ............... E21B 43/2401 166/248 |
| 2001/0049342 A1 | 12/2001 | Passey et al. |
| 2002/0013687 A1 | 1/2002 | Ortoleva |
| 2002/0023751 A1 | 2/2002 | Neuroth et al. |
| 2002/0029882 A1 | 3/2002 | Rouffignac et al. |
| 2002/0049360 A1 | 4/2002 | Wellington et al. |
| 2002/0056665 A1 | 5/2002 | Zeuthen et al. |
| 2002/0077515 A1 | 6/2002 | Wellington et al. |
| 2002/0099504 A1 | 7/2002 | Cross et al. |
| 2003/0070808 A1 | 4/2003 | Allison |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0141067 A1 | 7/2003 | Rouffignac et al. |
| 2003/0178195 A1 | 9/2003 | Agee et al. |
| 2003/0183390 A1 | 10/2003 | Veenstra et al. |
| 2003/0192691 A1 | 10/2003 | Vinegar et al. |
| 2003/0196788 A1 | 10/2003 | Vinegar et al. |

(56) References Cited

U.S. PATENT DOCUMENTS

| | | |
|---|---|---|
| 2003/0196789 A1 | 10/2003 | Wellington |
| 2003/0209348 A1 | 11/2003 | Ward et al. |
| 2003/0213594 A1 | 11/2003 | Wellington et al. |
| 2004/0020642 A1 | 2/2004 | Vinegar et al. |
| 2004/0040715 A1 | 3/2004 | Wellington et al. |
| 2004/0140095 A1 | 7/2004 | Vinegar et al. |
| 2004/0198611 A1 | 10/2004 | Atkinson |
| 2004/0200618 A1 | 10/2004 | Piekenbrock |
| 2004/0211557 A1 | 10/2004 | Cole et al. |
| 2005/0051327 A1 | 3/2005 | Vinegar et al. |
| 2005/0194132 A1 | 9/2005 | Dudley et al. |
| 2005/0199386 A1* | 9/2005 | Kinzer ............... E21B 43/2401 166/248 |
| 2005/0211434 A1 | 9/2005 | Gates et al. |
| 2005/0211569 A1 | 9/2005 | Botte et al. |
| 2005/0229491 A1 | 10/2005 | Loffler |
| 2005/0252656 A1 | 11/2005 | Maguire |
| 2005/0252832 A1 | 11/2005 | Doyle et al. |
| 2005/0252833 A1 | 11/2005 | Doyle et al. |
| 2005/0269077 A1 | 12/2005 | Sandberg |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0102345 A1 | 5/2006 | McCarthy et al. |
| 2006/0106119 A1 | 5/2006 | Guo et al. |
| 2006/0199987 A1 | 9/2006 | Kuechler et al. |
| 2006/0213657 A1 | 9/2006 | Berchenko et al. |
| 2007/0000662 A1* | 1/2007 | Symington ......... E21B 43/2401 166/248 |
| 2007/0023186 A1 | 2/2007 | Kaminsky et al. |
| 2007/0045265 A1 | 3/2007 | McKinzie, II |
| 2007/0045267 A1 | 3/2007 | Vinegar et al. |
| 2007/0084418 A1 | 4/2007 | Gurevich |
| 2007/0095537 A1 | 5/2007 | Vinegar |
| 2007/0102152 A1* | 5/2007 | Forgeron ............ E21B 43/2401 166/249 |
| 2007/0102359 A1 | 5/2007 | Lombardi et al. |
| 2007/0131415 A1 | 6/2007 | Vinegar et al. |
| 2007/0137869 A1 | 6/2007 | MacDougall et al. |
| 2007/0144732 A1 | 6/2007 | Kim et al. |
| 2007/0209799 A1 | 9/2007 | Vinegar et al. |
| 2007/0246994 A1 | 10/2007 | Kaminsky et al. |
| 2008/0073079 A1 | 3/2008 | Tranquilla |
| 2008/0087420 A1 | 4/2008 | Kaminsky et al. |
| 2008/0087421 A1 | 4/2008 | Kaminsky |
| 2008/0087422 A1 | 4/2008 | Kobler et al. |
| 2008/0087426 A1 | 4/2008 | Kaminsky |
| 2008/0087427 A1 | 4/2008 | Kaminsky et al. |
| 2008/0087428 A1 | 4/2008 | Symington et al. |
| 2008/0127632 A1 | 6/2008 | Finkenrath |
| 2008/0173442 A1 | 7/2008 | Vinegar et al. |
| 2008/0173443 A1 | 7/2008 | Symington et al. |
| 2008/0185145 A1 | 8/2008 | Carney et al. |
| 2008/0207970 A1 | 8/2008 | Meurer et al. |
| 2008/0230219 A1* | 9/2008 | Kaminsky ............... E21B 36/04 166/248 |
| 2008/0271885 A1 | 11/2008 | Kaminsky |
| 2008/0277317 A1 | 11/2008 | Touffait et al. |
| 2008/0283241 A1 | 11/2008 | Kaminsky et al. |
| 2008/0289819 A1 | 11/2008 | Kaminsky et al. |
| 2008/0290719 A1 | 11/2008 | Kaminsky et al. |
| 2008/0314593 A1 | 12/2008 | Vinegar et al. |
| 2009/0008079 A1* | 1/2009 | Zazovsky ............... E21B 36/04 166/60 |
| 2009/0032251 A1 | 2/2009 | Cavender et al. |
| 2009/0038795 A1 | 2/2009 | Kaminsky et al. |
| 2009/0050319 A1 | 2/2009 | Kaminsky et al. |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. |
| 2009/0200290 A1 | 8/2009 | Cardinal et al. |
| 2009/0211754 A1 | 8/2009 | Verret et al. |
| 2009/0288820 A1* | 11/2009 | Barron .................. B01J 13/02 166/249 |
| 2009/0308608 A1 | 12/2009 | Kaminsky et al. |
| 2010/0038083 A1 | 2/2010 | Bicerano |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1* | 4/2010 | Symington ......... E21B 43/2405 166/302 |
| 2010/0133143 A1 | 6/2010 | Roes et al. |
| 2010/0147512 A1* | 6/2010 | Cramer ................ E21B 43/267 166/250.1 |
| 2010/0218946 A1 | 9/2010 | Symington et al. |
| 2010/0258265 A1* | 10/2010 | Karanikas ............ E21B 43/243 165/45 |
| 2010/0276983 A1 | 11/2010 | Dunn et al. |
| 2010/0282460 A1 | 11/2010 | Stone et al. |
| 2010/0307744 A1 | 12/2010 | Cochet et al. |
| 2010/0314108 A1 | 12/2010 | Crews et al. |
| 2010/0319909 A1 | 12/2010 | Symington et al. |
| 2011/0000221 A1 | 1/2011 | Minta et al. |
| 2011/0000671 A1 | 1/2011 | Hershkowitz |
| 2011/0100873 A1 | 5/2011 | Viets et al. |
| 2011/0120710 A1* | 5/2011 | Dong ................. E21B 43/2408 166/272.3 |
| 2011/0127031 A1* | 6/2011 | Zolezzi Garreton ... E21B 28/00 166/249 |
| 2011/0146981 A1 | 6/2011 | Diehl |
| 2011/0146982 A1 | 6/2011 | Kaminsky et al. |
| 2011/0186295 A1 | 8/2011 | Kaminsky et al. |
| 2011/0257944 A1 | 10/2011 | Du et al. |
| 2011/0290490 A1 | 12/2011 | Kaminsky et al. |
| 2011/0309834 A1 | 12/2011 | Homan et al. |
| 2012/0012302 A1 | 1/2012 | Vogel et al. |
| 2012/0085535 A1 | 4/2012 | Mo et al. |
| 2012/0267110 A1 | 10/2012 | Meurer et al. |
| 2012/0325458 A1 | 12/2012 | El-Rabaa et al. |
| 2013/0043029 A1 | 2/2013 | Vinegar et al. |
| 2013/0106117 A1 | 5/2013 | Sites |
| 2013/0112403 A1 | 5/2013 | Meurer et al. |
| 2013/0277045 A1 | 10/2013 | Parsche |
| 2013/0292114 A1 | 11/2013 | Lin et al. |
| 2013/0292177 A1 | 11/2013 | Meurer et al. |
| 2013/0319662 A1 | 12/2013 | Alvarez et al. |
| 2015/0013967 A1* | 1/2015 | Parsche ............... E21B 43/2401 166/245 |
| 2015/0122491 A1* | 5/2015 | Meurer .................... E21B 36/04 166/250.02 |
| 2015/0300141 A1* | 10/2015 | Malot ................. E21B 43/2401 166/302 |
| 2016/0040519 A1 | 2/2016 | Friesen et al. |

FOREIGN PATENT DOCUMENTS

| | | |
|---|---|---|
| CA | 2377467 | 1/2001 |
| CA | 2560223 | 3/2007 |
| EP | 0387846 | 9/1990 |
| EP | 0866212 | 9/1998 |
| GB | 855408 | 11/1960 |
| GB | 1454324 | 11/1976 |
| GB | 1463444 | 2/1977 |
| GB | 1 478 880 | 7/1977 |
| GB | 1501310 | 2/1978 |
| GB | 1559948 | 1/1980 |
| GB | 1595082 | 8/1981 |
| GB | 2430454 | 3/2007 |
| WO | WO 82/01408 | 4/1982 |
| WO | WO 90/06480 | 6/1990 |
| WO | WO 99/67504 | 12/1999 |
| WO | WO 01/78914 | 10/2001 |
| WO | WO 01/81505 | 11/2001 |
| WO | WO 02/085821 | 10/2002 |
| WO | WO 03/035811 | 5/2003 |
| WO | WO 2005/010320 | 2/2005 |
| WO | WO 2005/045192 | 5/2005 |
| WO | WO 2005/091883 | 10/2005 |
| WO | WO 2006/115943 | 11/2006 |

(56) References Cited

FOREIGN PATENT DOCUMENTS

| WO | WO 2007/033371 | 3/2007 |
|---|---|---|
| WO | WO 2007/050445 | 5/2007 |
| WO | WO 2007/050479 | 5/2007 |
| WO | WO 2008/115359 | 9/2008 |
| WO | WO2010/011402 | 1/2010 |
| WO | WO 2010/047859 | 4/2010 |
| WO | WO 2011/116148 | 9/2011 |
| WO | WO2011/153339 | 12/2011 |
| WO | WO2014/028834 | 2/2014 |

OTHER PUBLICATIONS

McPherson, R.G., et al., "Recovery of Athabasca Bitumen with Electromagnetic Flood (EMF) Process," *The Journal of Canadian Petroleum*, pp. 44-51 (Feb. 28, 1985).
Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.
Chute, F. S., and Vermeulen, F. E., (1988) "Present and potential applications of electromagnetic heating in the In-Situ recovery of oil", AOSTRA J. Res., v. 4, pp. 19-33.
Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.
Cipolla, C.L., et al. (1994), "Practical Application of in-situ Stress Profiles", *Society of Petroleum Engineers*, SPE 28607, pp. 487-499.
Cook, G. L. et al. (1968) "The Composition of Green River Shale Oils" United Nations Symposium of the Development and Utilization of Oil Shale Resources, pp. 3-23.
Covell, J. R., et al. (1984) "Indirect in situ retorting of oil shale using the TREE process", Gary, J. H., ed., 17th Oil Shale Symposium Proceedings, Colorado School of Mines, pp. 46-58.
Cummins, J. J. et al. (1972) Thermal Degradation of Green River Kerogen at 150 to 350C: Rate of Product Formation, Report of Investigation 7620, *US Bureau of Mines*, 1972, pp. 1-15.
Day, R. L., (1998) "Solution Mining of Colorado Nahcolite," Wyoming State Geological Survey Public Information Circular 40, *Proceedings of the First International Soda Ash Conference*, V.II (Rock Springs, Wyoming, Jun. 10-12) pp. 121-130.
DePriester, C. et al. (1963) "Well Stimulation by Downhole Gas-Air Burner," *Jrnl. Petro. Tech.*, (Dec. 1963), pp. 1297-1302.
Domine, F. et al. (2002) "Up to What Temperature is Petroleum Stable? New Insights from a 5200 Free Radical Reactions Model", *Organic Chemistry*, 33, pp. 1487-1499.
Dougan, P. M. et al. (1981) "BX In Situ Oil Shale Project," *Colorado School of Mines; Fourteenth Oil Shale Symposium Proceedings*, 1981, pp. 118-127.
Dougan, P. M. (1979) "The BX In Situ Oil Shale Project," *Chem. Engr. Progress*, pp. 81-84.
Duba, A.G. (1977) "Electrical conductivity of coal and coal char," Fuel, vol. 56, pp. 441-443.
Duba, A. (1983) "Electrical conductivity of Colorado oil shale to 900C," Fuel, vol. 62, pp. 966-972.
Duncan, D. C., (1967) "Geologic Setting of Oil Shale Deposits and World Prospects," in *Proceedings of the Seventh World Petroleum Congress*, v.3, Elsevier Publishing, pp. 659-667.
Dunks, G. et al. (1983) "Electrochemical Studies of Molten Sodium Carbonate," *Inorg. Chem.*, 22, pp. 2168-2177.
Dusseault, M.B. (1998) "Casing Shear: Causes, Cases, Cures", Society of Petroleum Engineers, SPE 48,864 pp. 337-349.
Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado, Rocky Mountain Association of Geologists*, Guidebook, pp. 111-122.

Fainberg, V. et al. (1998) "Integrated Oil Shale Processing Into Energy and Chemicals Using Combined-Cycle Technology," *Energy Sources*, v.20.6, pp. 465-481.
Farouq Ali, S. M., (1994), "Redeeming features of in situ combustion", DOE/NIPER *Symposium on In Situ Combustion Practices—Past, Present, and Future Application*, Tulsa, OK, Apr. 21-22, No. ISC 1, p. 3-8.
Fisher, S. T. (1980) "A Comparison of Eleven Processes for Production of Energy from the Solid Fossil Fuels of North America," *SPE* 9098, pp. 1-27.
Fox, J. P., et al. (1979) "Partitioning of major, minor, and trace elements during simulated in situ oil shale retorting in a controlled-state retort", Twelfth Oil Shale Symposium Proceedings, Colorado School of Mines, Golden Colorado, Apr. 18-20, 1979.
Fox, J. P, (1980) "Water Quality Effects of LeachatesFrom an In-Situ Oil Shale Industry," *California Univ., Berkeley, Lawrence Berkeley Lab*, Chapters 6-7.
Fredrich, J. T. et al, (1996) "Three-Dimensional Geomechanical Simulation of Reservoir Compaction and Implications for Well Failures in the Belridge Diatomite", *Society of Petroleum Engineers* SPE 36698, pp. 195-210.
Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.
Fredrich, J. T. et al, (2003) "Stress Perturbations Adjacent to Salt Bodies in the Deepwater Gulf of Mexico", *Society of Petroleum Engineers* SPE 84554, pp. 1-14.
Frederiksen, S. et al, (2000) "A Numerical Dynamic Model for the Norwegian-Danish Basin", *Tectonophysics*, 343, 2001, pp. 165-183.
Freund, H. et al., (1989) "Low-Temperature Pyrolysis of Green River Kerogen", *The American Association of Petroleum Geologists Bulletin*, v. 73, No. 8 (August) pp. 1011-1017.
Gatens III, J. M. et al, (1990) "In-Situ Stress Tests and Acoustic Logs Determine Mechanical Properties and Stress Profiles in the Devonian Shales", *SPE Formation Evaluation* SPE 18523, pp. 248-254.
Garland, T. R., et al. (1979) "Influence of irrigation and weathering reactions on the composition of percolates from retorted oil shale in field lysimeters", Twelfth Oil Shale Symposium Proceedings, Colorado School of Mines, Golden Colorado, Apr. 18-20, 1979, pp. 52-57.
Garthoffner, E. H., (1998), "Combustion front and burned zone growth in successful California ISC projects", SPE 46244.
Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.
Hansen, K. S. et al, (1989) "Earth Stress Measurements in the South Belridge Oil Field, Kern County, California", *SPE Formation Evaluation*, December pp. 541-549.
Hansen, K. S. et al, (1993) "Finite-Element Modeling of Depletion-Induced Reservoir Compaction and Surface Subsidence in the South Belridge Oil Field, California", SPE 26074, pp. 437-452.
Hansen, K. S. et al, (1995) "Modeling of Reservoir Compaction and Surface Subsidence at South Belridge", *SPE Production & Facilities*, August pp. 134-143.
Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.
Hardy, M., et al. (2003) "Solution Mining of Nahcolite at American Soda's Yankee Gulch Project," *Mining Engineering*, Oct. 2003, pp. 23-31.
Henderson, W, et al. (1968) "Thermal Alteration as a Contributory Process to the Genesis of Petroleum", *Nature* vol. 219, pp. 1012-1016.
Hilbert, L. B. et al, (1999) "Field-Scale and Wellbore Modeling of Compaction-Induced Casing Failures", *SPE Drill. & Completion*, 14(2), June pp. 92-101.
Hill, G.R. et al. (1967) "The Characteristics of a Low Temperature In Situ Shale Oil," $4^{th}$ *Symposium on Oil Shale, Quarterly of the Colorado School of Mines*, v.62(3), pp. 641-656.

(56) References Cited

OTHER PUBLICATIONS

Hill, G. R. et al. (1967) "Direct Production of a Low Pour Point High Gravity Shale Oil", *I&EC Product Research and Development*, 6(1), March pp. 52-59.
Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.
Holmes, A. S. et al. (1982) "Process Improves Acid Gas Separation," *Hydrocarbon Processing*, pp. 131-136.
Holmes, A. S. et al. (1983) "Pilot Tests Prove Out Cryogenic Acid-Gas/Hydrocarbon Separation Processes," *Oil & Gas Journal*, pp. 85-86 and 89-91.
Humphrey, J. P. (1978) "Energy from in situ processing of Antrim oil shale", *DOE Report FE-2346-29*.
Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.
Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.
Jacobs, H. R. (1983) "Analysis of the Effectiveness of Steam Retorting of Oil Shale", *AIChE Symposium Series—Heat Transfer*—Seattle 1983 pp. 373-382.
Johnson, D. J. (1966) "Decomposition Studies of Oil Shale," *University of Utah*, May 1966.
Katz, D.L. et al. (1978) "*Predicting Phase Behavior of Condensate/Crude-Oil Systems Using Methane Interaction Coefficients, J. Petroleum Technology*", pp. 1649-1655.
Kenter, C. J. et al, (2004) "Geomechanics and 4D: Evaluation of Reservoir Characteristics from Timeshifts in the Overburden", *Gulf Rocks 2004, 6th North America Rock Mechanics Symposium (NARMS): Rock Mechanics Across Borders and Disciplines*, Houston, Texas, Jun. 5-9, ARMA/NARMS 04-627.
Kilkelly, M. K., et al. (1981), "Field Studies on Paraho Retorted Oil Shale Lysimeters: Leachate, Vegetation, Moisture, Salinity and Runoff, 1977-1980", prepared for Industrial Environmental Research Laboratory, U. S. Environmental Protection Agency, Cincinnati, OH.
Kuo, M. C. T. et al (1979) "Inorganics leaching of spent shale from modified in situ processing," J. H. Gary (ed.) *Twelfth Oil Shale Symposium Proceedings*, Colorado School of Mines, Golden CO., Apr. 18-20, pp. 81-93.
Laughrey, C. D. et al. (2003) "Some Applications of Isotope Geochemistry for Determining Sources of Stray Carbon Dioxide Gas," *Environmental Geosciences*, 10(3), pp. 107-122.
Lekas, M. A. et al. (1991) "Initial evaluation of fracturing oil shale with propellants for in situ retorting—Phase 2", *DOE Report DOE/MC/11076-3064*.
Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1-6-14.
Lundquist, L. (1951) "Refining of Swedish Shale Oil", *Oil Shale Cannel Coal Conference*, vol./Issue: 2, pp. 621-627.
Marotta, A. M. et al, (2003) "Numerical Models of Tectonic Deformation at the Baltica-Avalonia Transition Zone During the Paleocene Phase of Inversion", *Tectonophysics*, 373, pp. 25-37.
Tzanco, E. T., et al. (1990), "Laboratory Combustion Behavior of Countess B Light Oil", *Petroleum Soc. of CIM and SPE*, Calgary, Jun. 10-13, No. CIM/SPE 90-63, p. 63.1-63.16.
Veatch, Jr. R.W. and Martinez, S.J., et al. (1990) "Hydraulic Fracturing: SPE Reprint Series No. 28", *Soc. of Petroleum Engineers* SPE 14085, Part I, Overview, pp. 12-44.
Vermeulen, F.E., et al. (1983) "Electromagnetic Techniques in the In-Situ Recovery of Heavy Oils", *Journal of Microwave Power*, 18(1) pp. 15-29.
Warpinski, N.R., (1989) "Elastic and Viscoelastic Calculations of Stresses in Sedimentary Basins", *SPE Formation Evaluation*, vol. 4, pp. 522-530.

Yen, T. F. et al. (1976) *Oil Shale*, Amsterdam, Elsevier, p. 215-267.
Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.
Oil & Gas Journal, 1998, "Aussie oil shale project moves to Stage 2", Oct. 26, p. 42.
"Encyclopedia of Chemical Technology" (4th ed.), *Alkali and Chlorine Products*, pp. 1025-1039 (1998).
Miknis, F.P, et al (1985) "Isothermal Decomposition of Colorado Oil Shale", DOE/FE/60177-2288 (DE87009043) May 1985.
Mohammed, Y.A., et al (2001) "A Mathematical Algorithm for Modeling Geomechanical Rock Properties of the Khuff and PreKhuff Reservoirs in Ghawar Field", *Society of Petroleum Engineers* SPE 68194, pp. 1-8.
Molenaar, M. M. et al, (2004) "Applying Geo-Mechanics and 4D: '4D In-Situ Stress' as a Complementary Tool for Optimizing Field Management", *Gulf Rocks 2004, 6th North America Rock Mechanics Symposium (NARMS): Rock Mechanics Across Borders and Disciplines*, Houston, Texas, Jun. 5-9, ARMA/NARMS 04-639, pp. 1-8.
Moschovidis, Z. (1989) "Interwell Communication by Concurrent Fracturing—a New Stimulation Technique", *Journ. of Canadian Petro. Tech.* 28(5), pp. 42-48.
Motzfeldt, K. (1954) "The Thermal Decomposition of Sodium Carbonate by the Effusion Method," *Jrnl. Phys. Chem.*, v. LIX, pp. 139-147.
Mut, Stephen (2005) "The Potential of Oil Shale," *Shell Oil Presentation at National Academies, Trends in Oil Supply Demand*, in Washington, DC, Oct. 20-21, 2005, 11 pages.
Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.
Newkirk, A. E. et al. (1958) "Drying and Decomposition of Sodium Carbonate," *Anal. Chem.*, 30(5), pp. 982-984.
Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.
Nordin, J. S, et al. (1988), "Groundwater studies at Rio Blanco Oil Shale Company's retort 1 at Tract C-a", DOE/MC/11076-2458.
Nottenburg, R.N. et al. (1979) "Temperature and stress dependence of electrical and mechanical properties of Green River oil shale," *Fuel*, 58, pp. 144-148.
Nowacki, P. (ed.), (1981) *Oil Shale Technical Handbook*, Noyes Data Corp. pp. 4-23, 80-83 & 160-183.
Pattillo, P. D. et al, (1998) "Reservoir Compaction and Seafloor Subsidence at Valhall", SPE 47274, 1998, pp. 377-386.
Pattillo, P. D. et al, (2002) "Analysis of Horizontal Casing Integrity in the Valhall Field", SPE 78204, pp. 1-10.
Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.
Peters, G., (1990) "The Beneficiation of Oil Shale by the Solution Mining of Nahcolite," *23rd Colorado School of Mines Oil Shale Symposium* (Golden, CO) pp. 142-151.
Pope, M.I. et al. (1961) "The specific electrical conductivity of coals," Fuel, vol. 40, pp. 123-129.
Plischke, B., (1994) "Finite Element Analysis of Compaction and Subsidence—Experience Gained from Several Chalk Fields", *Society of Petroleum Engineers*, SPE 28129, 1994, pp. 795-802.
Poulson, R. E., et al. (1985), "Organic Solute Profile of Water from Rio Blanco Retort 1", DOE/FE/60177-2366.
Prats, M. et al. (1975) "The Thermal Conductivity and Diffusivity of Green River Oil Shales", *Journal of Petroleum Technology*, pp. 97-106, Jan. 1975.
Prats, M., et al. (1977) "Soluble-Salt Processes for In-Situ Recovery of Hydrocarbons from Oil Shale," *Journal of Petrol. Technol.*, pp. 1078-1088.
Rajeshwar, K. et al. (1979) "Review: Thermophysical Properties of Oil Shales", *Journal of Materials Science*, v.14, pp. 2025-2052.
Ramey, M. et al. (2004) "The History and Performance of Vertical Well Solution Mining of Nahcolite ($NaHCO_3$) in the Piceance

(56) References Cited

OTHER PUBLICATIONS

Basin, Northwestern, Colorado, USA," *Solution Mining Research Institute: Fall 2004 Technical Meeting* (Berlin, Germany).

Reade Advanced Materials; 2006 About.com Electrical resistivity of materials. [Retrieved on Oct. 15, 2009] Retrieved from internet: URL: http://www.reade.com/Particle%5FBriefings/elec%5Fres.html. Entire Document.

Rio Blanco Oil Shale Company, (1986), "MIS Retort Abandonment Program" Jun. 1986 Pumpdown Operation.

Riva, D. et al. (1998) "Suncor down under: the Stuart Oil Shale Project", Annual Meeting of the *Canadian Inst. of Mining, Metallurgy, and Petroleum*, Montreal, May 3-7.

Robson, S. G. et al., (1981), "Hydrogeochemistry and simulated solute transport, Piceance Basin, northwestern Colorado", U. S. G. S. Prof. Paper 1196.

Rupprecht, R. (1979) "Application of the Ground-Freezing Method to Penetrate a Sequence of Water-Bearing and Dry Formations—Three Construction Cases," *Engineering Geology*, 13, pp. 541-546.

Ruzicka, D.J. et al. (1987) "Modified Method Measures Bromine Number of Heavy Fuel Oils", *Oil & Gas Journal*, 85(31), Aug. 3, pp. 48-50.

Salamonsson, G. (1951) "The Ljungstrom In Situ Method for Shale-Oil Recovery," $2^{nd}$ *Oil Shale and Cannel Coal Conference*, 2, Glasgow, Scotland, Inst. of Petrol., London, pp. 260-280.

Sahu, D. et al. (1988) "Effect of Benzene and Thiophene on Rate of Coke Formation During Naphtha Pyrolysis", *Canadian Journ. of Chem. Eng.*, 66, Oct. pp. 808-816.

Sandberg, C. R. et al. (1962) "In-Situ Recovery of Oil from Oil Shale—A Review and Summary of Field and Laboratory Studies," RR62.039FR, Nov. 1962.

Sierra, R. et al. (2001) "Promising Progress in Field Application of Reservoir Electrical Heating Methods," *SPE 69709*, SPE Int'l Thermal Operations and Heavy Oil Symposium, Venezuela, Mar. 2001.

Siskin, M. et al. (1995) "Detailed Structural Characterization of the Organic Material in Rundel Ramsay Crossing and Green River Oil Shales," *Kluwer Academic Publishers*, pp. 143-158.

Smart, K. J. et al, (2004) "Integrated Structural Analysis and Geomechanical Modeling: an Aid to Reservoir Exploration and Development", *Gulf Rocks 2004, $6^{th}$ North America Rock Mechanics Symposium (NARMS): Rock Mechanics Across Borders and Disciplines*, Houston, Texas, Jun. 5-9, ARMA/NARMS 04-470.

Smith, F. M. (1966) "A Down-hole Burner—Versatile Tool for Well Heating," $25^{th}$ *Tech. Conf. on Petroleum Production*, Pennsylvania State Univ., pp. 275-285.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stanford University, (2008) "Transformation of Resources to Reserves: Next Generation Heavy-Oil Recovery Techniques", Prepared for U.S. Department of Energy, National Energy Technology Laboratory, DOE Award No. DE-FC26-04NT15526, Mar. 28, 2008.

Stevens, A. L., and Zahradnik, R. L. (1983) "Results from the simultaneous processing of modified in situ retorts 7& 8", Gary, J. H., ed., $16^{th}$ *Oil Shale Symp.*, CSM, p. 267-280.

Stoss, K. et al. (1979) "Uses and Limitations of Ground Freezing With Liquid Nitrogen," *Engineering Geology*, 13, pp. 485-494.

Symington, W.A., et al (2006) "ExxonMobil's electrofrac process for in situ oil shale conversion," 26th Oil Shale Symposium, Colorado School of Mines.

Syunyaev, Z.I. et al. (1965) "Change in the Resistivity of Petroleum Coke on Calcination," Chemistry and Technology of Fuels and Oils, 1(4), pp. 292-295.

Taylor, O. J., (1987), "Oil Shale, Water Resources and Valuable Minerals of the Piceance Basin, Colorado: The Challenge and Choices of Development". U. S. Geol. Survey Prof. Paper 1310, pp. 63-76.

Templeton, C. C. (1978) "Pressure-Temperature Relationship for Decomposition of Sodium Bicarbonate from 200 to 600° F.," *J. of Chem. and Eng. Data*, 23(1), pp. 7-8.

Thomas, A. M. (1963) "Thermal Decomposition of Sodium Carbonate Solutions," *J. of Chem. and Eng. Data*, 8(1), pp. 51-54.

Thomas, G. W. (1964) "A Simplified Model of Conduction Heating in Systems of Limited Permeability," *Soc.Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. et al. (1967) "Thermal Conductivity and Thermal Diffusivity of Green River Oil Shale," *Thermal Conductivity: Proceedings of the Seventh Conference* (Nov. 13-16, 1967), *NBS Special Publication 302*, pp. 529-535, 1968.

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

Tisot, P. R. et al. (1971) "Structural Deformation of Green River Oil Shale as It Relates to In Situ Retorting," *US Bureau of Mines Report of Investigations 7576*, 1971.

Tisot, P. R. (1975) "Structural Response of Propped Fractures in Green River Oil Shale as It Relates to Underground Retorting," *US Bureau of Mines Report of Investigations 8021*.

Tissot, B. P., and Welte, D. H. (1984) Petroleum Formation and Occurrence, New York, Springer-Verlag, p. 160-198 and 254-266.

Tissot, B. P., and Welte, D. H. (1984) *Petroleum Formation and Occurrence*, New York, Springer-Verlag, p. 267-289 and 470-492.

Turta, A., (1994), "In situ combustion—from pilot to commercial application", *DOE/NIPER Symposium on In Situ Combustion Practices—Past, Present, and Future Application*, Tulsa, OK, Apr. 21-22, No. ISC 3, p. 15-39.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Ali, A.H.A, et al, (2003) "Watching Rocks Change—Mechanical Earth Modeling", *Oilfield Review*, pp. 22-39.

Allred, (1964) "Some Characteristic Properties of Colorado Oil Shale Which May Influence In Situ Processing," *Quarterly Colo. School of Mines, $1^{st}$ Symposium Oil Shale*, v.59. No. 3, pp. 47-75.

Anderson, R., et al (2003) "Power Generation with 100% Carbon Capture Sequestration" $2^{nd}$ Annual Conference on Carbon Sequestration, Alexandria, VA.

Asquith, G., et al., (2004) *Basic Well Log Analysis*, Second Ed., Chapter 1, pp. 1-20.

Ball, J.S., et al. (1949) "Composition of Colorado Shale-Oil Naphtha", *Industrial and Engineering Chemistry*, vol. 41, No. 3 pp. 581-587.

Barnes, A. L. et al. (1968) "A Look at In Situ Oil Shale Retorting Methods Based on Limited Heat Transfer Contact Surfaces" Quarterly of the Colorado School of Mines *Fifth Symposium on Oil Shale*, v. 63(4), Oct. 1968, pp. 827-852.

Bastow, T.P., (1998) Sedimentary Processes Involving Aromatic Hydrocarbons >>. Thesis (PhD in Applied Chemistry) Curtin University of Technology (Australia), December, p. 1-92.

Baughman, G. L. (1978) *Synthetic Fuels Data Handbook*, Second Edition, Cameron Engineers Inc. pp. 3-145.

Berry, K. L., et al. (1982) "Modified in situ retorting results of two field retorts", Gary, J. H., ed., 15th Oil Shale Symp., CSM, pp. 385-396.

Blanton, T. L. et al, (1999) "Stress Magnitudes from Logs: Effects of Tectonic Strains and Temperature", *SPE Reservoir Eval. & Eng. 2*, vol. 1, February, pp. 62-68.

Bondarenko, S.T., et al., (1959) "Application of electrical current for direct action on a seam of fuel in shaftless underground gasification," Academy of Sciences of the USSR, Translated for Lawrence Livermore Laboratory by Addis Translations International in March 1976, pp. 25-41.

Boyer, H. E. et al. (1985) "Chapter 16: Heat-Resistant Materials," *Metals Handbook*, American Society for Metals, pp. 16-1-16-26.

(56) References Cited

OTHER PUBLICATIONS

Brandt, A. R., (2008) "*Converting Oil Shale to Liquid Fuels: Energy Inputs and Greenhouse Gas Emissions of the Shell in Situ Conversion Process*," Environ. Sci. Technol. 2008, 42, pp. 7489-7495.
Brandt, H. et al. (1965) "Stimulating Heavy Oil Reservoirs With Downhole Air-Gas Burners," *World Oil*, (Sep. 1965), pp. 91-95.
Braun, R.L. et al. (1990) "Mathematical model of oil generation, degradation, and expulsion," Energy Fuels, vol. 4, No. 2, pp. 132-146.
Bridges, J. E., et al. (1983) "The IITRI in situ fuel recovery process", *J. Microwave Power*, v. 18, pp. 3-14.
Bridges, J.E., (2007) "Wind Power Energy Storage for In Situ Shale Oil Recovery With Minimal CO2 Emissions", IEEE Transactions on Energy Conversion, vol. 22, No. 1 Mar. 2007, pp. 103-109.
Burnham, A.K. (1979) "Reaction kinetics between CO2 and oil-shale residual carbon 1. Effect of heating rate on reactivity," Fuel, vol. 58, pp. 285-292.
Burnham, A. K. et al. (1983) "High-Pressure Pyrolysis of Green River Oil Shale" in Geochemistry and Chemistry of Oil Shales: ACS Symposium Series, pp. 335-351.
Burwell, E. L. et al. (1970) "Shale Oil Recovery by In-Situ Retorting—A Pilot Study" Journal of Petroleum Engr., Dec. 1970, pp. 1520-1524.
Campbell, J.H. (1978) "The Kinetics of decomposition of Colorado oil shale II. Carbonate minerals," Lawrence Livermore Laboratory UCRL-52089.

\* cited by examiner

MITIGATING THE EFFECTS OF SUBSURFACE SHUNTS DURING BULK HEATING OF A SUBSURFACE FORMATION

CROSS-REFERENCE TO RELATED APPLICATION

This application claims the benefit of U.S. Provisional Patent Application 62/082,943 filed Nov. 21, 2014 entitled MITIGATING THE EFFECTS OF SUBSURFACE SHUNTS DURING BULK HEATING OF A SUBSURFACE FORMATION, and U.S. Provisional Patent Application 62/082,948 filed Nov. 21, 2014 entitled METHOD OF RECOVERING HYDROCARBONS WITHIN A SUBSURFACE FORMATION, the entirety of both of which are incorporated by reference herein.

FIELD

The present disclosure relates to systems and methods for mitigating the effects of subsurface shunts during bulk heating of a subsurface formation.

BACKGROUND

Certain subsurface formations may include organic matter, such as shale oil, bitumen, and/or kerogen, which has material and chemical properties that may complicate production of fluid hydrocarbons from the subsurface formation. For example, the organic matter may not flow at a rate sufficient for production. Moreover, the organic matter may not include sufficient quantities of desired chemical compositions (typically smaller hydrocarbons). Hence, recovery of useful hydrocarbons from such subsurface formations may be uneconomical or impractical.

Heating of organic matter-containing subsurface formations may be particularly useful in recovering hydrocarbons from oil shale formations. For example, heating organic matter-containing subsurface formations pyrolyzes kerogen into mobile liquids and gases, and may reduce the viscosity of heavy oil to enhance hydrocarbon mobility.

One method to heat a subsurface formation is to conduct electricity through the formation and, thus, resistively heat the subsurface formation. This method of heating a subsurface formation may be referred to as "bulk heating" of the subsurface formation. Bulk heating of the subsurface formation may be accomplished by providing electrode assemblies in the subsurface formation and conducting electricity between pairs of the electrode assemblies. The electrode assemblies may be contained in wellbores and/or manmade fractures, and the electrode assemblies may include electrical conductors, such as metal rods and granular electrically conductive materials.

As heating occurs in subsurface regions between the pairs of electrode assemblies, the electrical conductivity (or alternatively, resistivity) of the subsurface regions may change. This change in the electrical conductivity (or resistivity) of the subsurface regions may be due to physical and/or chemical changes within the subsurface regions, for example, due to temperature sensitivity of the electrical resistance of the native rock, due to native brine boiling off, and/or due to pyrolysis (and/or coking) of native hydrocarbons.

Heating a subsurface region via electrical conduction through the subsurface region may not occur uniformly and may suffer from instabilities, in particular if conductivity within the subsurface region increases strongly with increasing temperature. The conductivity increase within the subsurface region may result from pyrolysis occurring and may lead to the formation of electrically-conductive coke or other graphitic materials. When electrical conductivity increases strongly with increasing temperature, hotter regions will become even hotter, since electricity may channel through the hotter (and more conductive) regions. Ultimately, this positive correlation between temperature and electrical conductivity may lead to the formation of a narrow, highly-conductive shunt between the electrode assemblies that will short-circuit the electrical flow between the electrode assemblies. Although the electrode assemblies may be large in extent or area, the bulk of the electrical flow may occur through a very small zone and heating of the subsurface region between the electrode assemblies may be quite uneven. This phenomenon is analogous to viscous fingering that may occur when a low viscosity fluid is driven through a higher viscosity fluid. In bulk heating, the tendency for shunting instabilities to occur and the rate of shunt growth may be dependent on the heating rate and the extent to which electrical and physical property heterogeneities exist within the subsurface regions.

Conventional methods to minimize the effects of subsurface shunts during bulk heating include disconnecting at least one of the affected electrode assemblies (electrode assemblies that conduct current into a shunted region). Where an affected electrode assembly serves more than one subsurface region, disconnecting the affected electrode assembly stops the generation of heat in the shunted region and all other (unaffected) subsurface regions served by the affected electrode.

In view of the aforementioned disadvantages, there is a need for alternative methods for mitigating the effects of subsurface shunts during bulk heating of a subsurface formation.

SUMMARY

It is an object of the present disclosure to provide systems and methods for mitigating the effects of subsurface shunts during bulk heating of a subsurface formation.

A method of bulk heating of a subsurface formation with a first electrode assembly in the subsurface formation, a second electrode assembly in the subsurface formation, and a third electrode assembly in the subsurface formation may include electrically connecting the first electrode assembly to a first alternating voltage having a frequency and a first phase angle; electrically connecting the second electrode assembly to a second alternating voltage having the frequency and a second phase angle different from the first phase angle, and forming a first in situ resistive heater in a first subsurface region between the first electrode assembly and the second electrode assembly; electrically connecting the third electrode assembly to a third alternating voltage having the frequency and a third phase angle different from the second phase angle and forming a second in situ resistive heater in a second subsurface region between the second electrode assembly and the third electrode assembly; concurrently applying the first, second, and third alternating voltages to the first, second, and third electrode assemblies, respectively; and upon determining a presence of a subsurface shunt between the first electrode assembly and the second electrode assembly, electrically connecting the first electrode assembly to the second alternating voltage and applying the second alternating voltage to the first and second electrode assemblies while applying the third alternating voltage to the third electrode assembly.

A method of bulk heating a subsurface formation with a row of electrode assemblies in the subsurface formation, wherein the row of electrode assemblies includes a first electrode assembly at one end of the row and a last electrode assembly at another end of the row, and wherein each of the electrode assemblies in the row of electrode assemblies, except the first electrode assembly and the last electrode assembly, contribute to two pairs of adjacent electrode assemblies may include forming an electrical circuit for each pair of adjacent electrode assemblies by applying alternating voltages with a same frequency and nonequal phase angles to the electrode assemblies in the pair of adjacent electrode assemblies, wherein the electrical circuit includes flowing electricity through a subsurface region of the subsurface formation between the pair of adjacent electrode assemblies and resistively heating the subsurface region; and upon determining a presence of a subsurface shunt between one of the pairs of adjacent electrode assemblies, applying alternating voltages with the same frequency and equal phase angles to the electrode assemblies in the one of the pairs of adjacent electrode assemblies, and, for each other pair of adjacent electrode assemblies, applying alternating voltages with the same frequency and nonequal phase angles to the electrode assemblies in the pair.

A method of bulk heating of a subsurface formation with a first row of parallel fractures and a second row of parallel fractures, each of the fractures including electrically conductive material, wherein the first row is parallel to the second row, wherein the fractures of the first row do not extend in between the fractures of the second row, and wherein each fracture of the second row has two closest fractures in the first row may include (a) for each fracture of the second row and the corresponding two fractures in the first row that are closest to the fracture of the second row, applying an alternating voltage with a same frequency and a first phase angle to the fracture of the second row and to a first fracture of the two closest fractures in the first row, and applying an alternating voltage with the same frequency and a second phase angle to a second fracture of the two closest fractures in the first row to resistively heat a first subsurface region between the fracture of the second row and the second fracture of the two closest fractures; (b) for each fracture of the second row and the corresponding two fractures in the first row that are closest to the fracture of the second row, applying an alternating voltage with the same frequency and a third phase angle to the fracture of the second row and to the second fracture of the two closest fractures in the first row, and applying an alternating voltage with the same frequency and a fourth different phase angle to the first fracture of the two closest fractures in the first row to resistively heat a second subsurface region between the fracture of the second row and the first fracture of the two closest fractures; and (c) periodically repeating step (a) and then step (b).

The foregoing has broadly outlined the features of the present disclosure so that the detailed description that follows may be better understood. Additional features will also be described herein.

DESCRIPTION OF THE DRAWINGS

These and other features, aspects, and advantages of the present disclosure will become apparent from the following description and the accompanying drawings, which are briefly discussed below.

Figure 1:
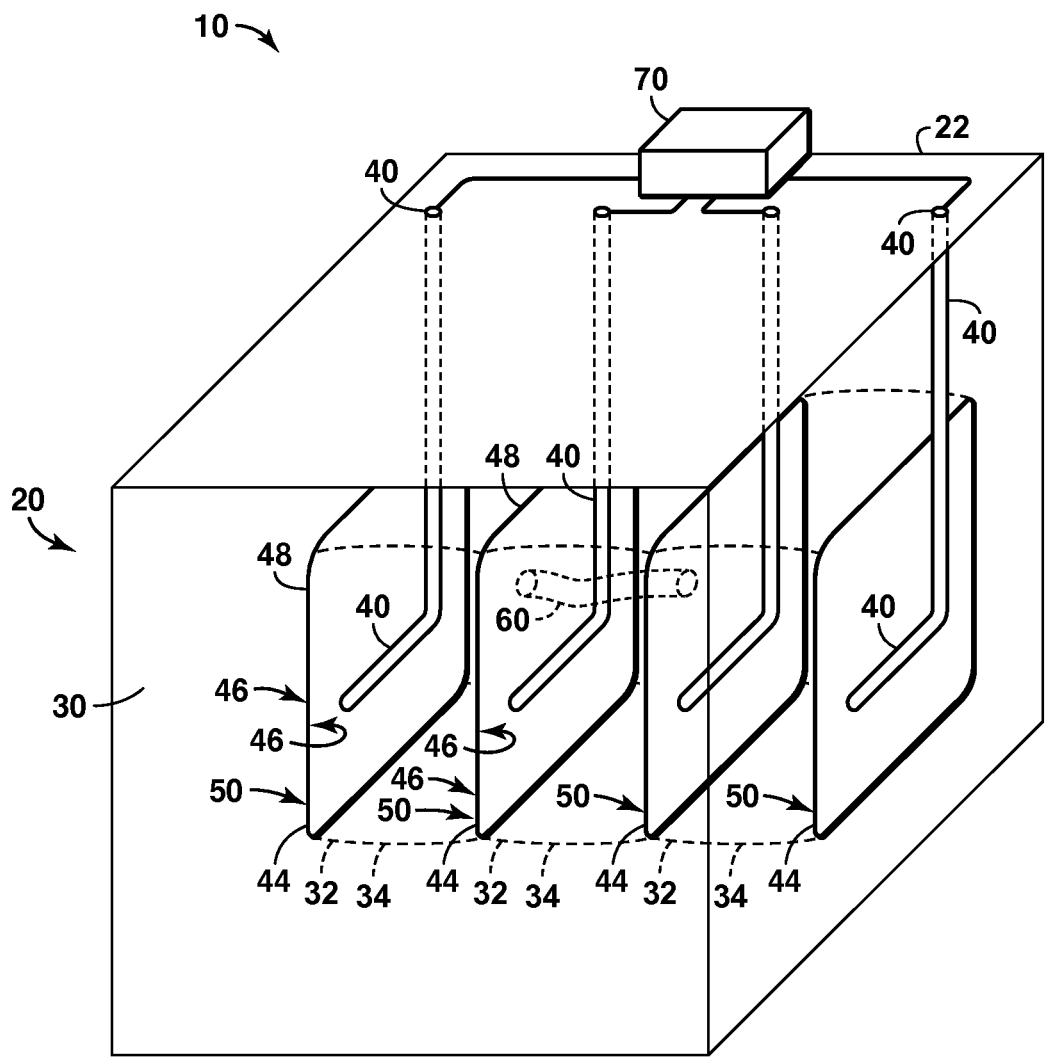
FIG. 1 is a schematic representation of electrode assemblies in a subsurface formation.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein, are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

As used herein, the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, heavy oil and kerogen that can be used as a fuel or upgraded into a fuel.

"Heavy oil" includes oils which are classified by the American Petroleum Institute ("API"), as heavy oils, extra heavy oils, or bitumens. The term "heavy oil" includes bitumen. Heavy oil may have a viscosity of about 1,000 centipoise (cP) or more, 10,000 cP or more, 100,000 cP or more, or 1,000,000 cP or more. In general, a heavy oil has an API gravity between 22.3° API (density of 920 kilograms per meter cubed ($kg/m^3$) or 0.920 grams per centimeter cubed ($g/cm^3$)) and 10.0° API (density of 1,000 $kg/m^3$ or 1 $g/cm^3$). An extra heavy oil, in general, has an API gravity of less than 10.0° API (density greater than 1,000 $kg/m^3$ or 1 $g/cm^3$). For example, a source of heavy oil includes oil sand or bituminous sand, which is a combination of clay, sand, water and bitumen. The recovery of heavy oils is based on the viscosity decrease of fluids with increasing temperature or solvent concentration. Once the viscosity is reduced, the mobilization of fluid by steam, hot water flooding, or gravity is possible. The reduced viscosity makes the drainage or dissolution quicker and therefore directly contributes to the recovery rate.

As used herein, the term "fluid" refers to gases, liquids, and combinations of gases and liquids, as well as to combinations of gases and solids, and combinations of liquids and solids.

As used herein, the term "formation hydrocarbons" refers to both light and/or heavy hydrocarbons and solid hydrocarbons that are contained in an organic-rich rock formation. Formation hydrocarbons may be, but are not limited to, natural gas, oil, kerogen, oil shale, coal, tar, natural mineral waxes, and asphaltenes.

As used herein, the term "gas" refers to a fluid that is in its vapor phase at 1 atmosphere (atm) and 15 degrees Celsius (° C.).

As used herein, the term "kerogen" refers to a solid, insoluble hydrocarbon that may principally contain carbon, hydrogen, nitrogen, oxygen, and/or sulfur.

As used herein, the term "oil" refers to a hydrocarbon fluid containing primarily a mixture of condensable hydrocarbons.

As used herein, the term "oil shale" refers to any fine-grained, compact, sedimentary rock containing organic matter made up mostly of kerogen, a high-molecular weight solid or semi-solid substance that is insoluble in petroleum solvents and is essentially immobile in its rock matrix.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites. Organic-rich rock may contain kerogen.

As used herein, the term "organic-rich rock formation" refers to any formation containing organic-rich rock. Organic-rich rock formations include, for example, oil shale formations, coal formations, oil sands formations or other formation hydrocarbons.

As used herein, "overburden" refers to the material overlying a subterranean reservoir. The overburden may include rock, soil, sandstone, shale, mudstone, carbonate and/or ecosystem above the subterranean reservoir. During surface mining the overburden is removed prior to the start of mining operations. The overburden may refer to formations above or below free water level. The overburden may include zones that are water saturated, such as fresh or saline aquifers. The overburden may include zones that are hydrocarbon bearing.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, "reservoir" or "subterranean reservoir" is a subsurface rock or sand formation from which a production fluid or resource can be harvested. The rock formation may include sand, granite, silica, carbonates, clays, and organic matter, such as oil shale, light or heavy oil, gas, or coal, among others. Reservoirs can vary in thickness from less than one foot (0.3048 meter (m)) to hundreds of feet (hundreds of meters).

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein "subsurface formation" refers to the material existing below the Earth's surface. The subsurface formation may interchangeably be referred to as a formation or a subterranean formation. The subsurface formation may comprise a range of components, e.g. minerals such as quartz, siliceous materials such as sand and clays, as well as the oil and/or gas that is extracted.

As used herein, "underburden" refers to the material underlaying a subterranean reservoir. The underburden may include rock, soil, sandstone, shale, mudstone, wet/tight carbonate and/or ecosystem below the subterranean reservoir.

As used herein, "wellbore" is a hole in the subsurface formation made by drilling or inserting a conduit into the subsurface. A wellbore may have a substantially circular cross section or any other cross-section shape, such as an oval, a square, a rectangle, a triangle, or other regular or irregular shapes. The term "well," when referring to an opening in the formation, may be used interchangeably with the term "wellbore." Further, multiple pipes may be inserted into a single wellbore, for example, as a liner configured to allow flow from an outer chamber to an inner chamber.

The terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

The articles "the", "a" and "an" are not necessarily limited to mean only one, but rather are inclusive and open ended so as to include, optionally, multiple such elements.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Where two or more ranges are used, such as but not limited to 1 to 5 or 2 to 4, any number between or inclusive of these ranges is implied.

As used herein, the phrase, "for example," the phrase, "as an example," and/or simply the term "example," when used with reference to one or more components, features, details, structures, and/or methods according to the present disclosure, are intended to convey that the described component, feature, detail, structure, and/or method is an illustrative, non-exclusive example of components, features, details, structures, and/or methods according to the present disclosure. Thus, the described component, feature, detail, structure, and/or method is not intended to be limiting, required, or exclusive/exhaustive; and other components, features, details, structures, and/or methods, including structurally and/or functionally similar and/or equivalent components, features, details, structures, and/or methods, are also within the scope of the present disclosure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

FIGS. 1-12 provide examples of systems and methods, according to the present disclosure, for mitigating the effects of subsurface shunts during bulk heating of a subsurface formation. The systems and methods may use voltage switching to mitigate the effects of subsurface shunts during bulk heating of a subsurface formation. Elements that serve a similar, or at least substantially similar, purpose are labeled with numbers consistent among the figures. The corresponding elements with like numbers in each of the figures may not be discussed in detail herein with reference to each of the figures. Similarly, all elements may not be labeled in each of the figures, but associated reference numerals may be utilized for consistency. Elements, components, and/or features that are discussed with reference to one or more of the figures may be included in and/or utilized with any of the figures without departing from the scope of the present disclosure.

In general, elements that are likely to be included are illustrated in solid lines, while elements that are optional are illustrated in dashed lines. However, elements that are shown in solid lines may not be essential. Thus, an element shown in solid lines may be omitted without departing from the scope of the present disclosure.

FIG. 1 is a schematic representation of a bulk heating system 10. Bulk heating systems 10 may comprise at least three electrode assemblies 50 that extend from a surface, or surface region 22 of the Earth. The at least three electrode assemblies 50 may form, or define, at least two pairs of electrode assemblies 50. More specifically, electrode assemblies 50 are in electrical communication with a subsurface formation 20, and the electrode assemblies are configured in adjacent pairs to form electrical circuits with a subsurface region 32 between each pair of electrode assemblies 50. Individual electrode assemblies 50 may be a member of more than one pair of electrode assemblies 50 and may be in electrical communication with more than one subsurface region 32. Though, for clarity, FIG. 1 illustrates four spaced-apart electrode assemblies 50, bulk heating systems 10 may comprise three or more electrode assemblies 50, for example, 4, 5, 6, or more than 6 electrode assemblies 50.

Subsurface formation 20 is a finite subsurface (subterranean) region. Subsurface formation 20 may be of any geologic form and may contain one or more organic matter-containing regions (e.g., layers, intervals, etc.), one or more regions with little to no organic matter, an overburden, and/or an underburden. Subsurface formation 20 may be below an overburden and/or above an underburden. In FIG. 1, subsurface formation 20 is schematically indicated to include organic matter 30 (e.g., a solid, liquid, and/or gaseous hydrocarbon mineral such as hydrocarbon compounds, shale oil, bitumen, bituminous coal, and/or kerogen). Subsurface formation 20 may be at least 100 m (meters), at least 200 m, at least 500 m, at least 1,000 m, at least 2,000 m, at least 5,000 m, at most 20,000 m, at most 10,000 m, at most 5,000 m, at most 2,000 m, at most 1,000 m, and/or at most 500 m below the Earth's surface 22. Suitable depth ranges may include combinations of any upper and lower depth listed above or any number within or bounded by the preceding depth ranges.

Subsurface regions 32 may be portions of the subsurface formation 20 that are in electrical contact with at least two electrode assemblies 50, i.e., subsurface regions 32 adjoin at least two adjacent electrode assemblies 50. Subsurface regions 32 generally may extend between at least a pair of electrode assemblies 50.

Subsurface regions 32 may be the regions heated by the bulk heating system 10 via electrical resistive heating (Joule heating). Subsurface regions 32 may be electrically powered (also called energized) to cause resistive heating, i.e., electrical power dissipated within a given subsurface region 32 may heat the given subsurface region 32. Electrically powering (also referred to as transmitting electricity) may be the result of connecting different voltages to different electrode assemblies 50 and applying the voltages to cause current to flow through the subsurface region 32 between the electrode assemblies 50. When electrically powered and resistively heating, subsurface regions 32 may be referred to as in situ resistive heaters 34.

Electrode assemblies 50 may include at least one wellbore 40 and/or fracture 44. Electrode assemblies 50 may include electrically conductive material sufficient to conduct electricity to the adjoining subsurface region(s) 32 without undue power loss (due to electrical resistive heating). An electrode assembly 50 may be electrically connected to one or more subsurface regions 32 of the subsurface formation 20 that adjoin the electrode assembly 50. An electrode assembly 50 may include a wellbore 40 that includes an electrically conductive wire, cable, casing, tubular, rod, etc., and that is electrically connected to at least one subsurface region 32 adjoining the wellbore 40. An electrode assembly 50 may include a fracture 44 that includes conductive media such as electrically conductive particulate and/or electrically conductive fluid.

Wellbores 40, also called wells, are holes in the Earth (extending from the surface 22 to the subsurface formation 20), typically made by drilling or insertion of a conduit into the Earth. Wellbores 40 may be substantially vertical, substantially horizontal, any angle between vertical and horizontal, deviated or non-deviated, and combinations thereof, for example, a vertical well with a non-vertical segment. As used herein, "substantially vertical" means within 15° of true vertical and "substantially horizontal" means within 15° of true horizontal. Wellbores 40 may include and/or may be supported, lined, sealed, and/or filled with materials such as casings, linings, sheaths, conduits, electrically conductive materials (e.g., metal rods, metal cables, metal wires, metal tubulars, electrically conductive particulate, electrically conductive granular materials, and/or electrically conductive liquid). Wellbores 40 may be configured to be in electrical and/or fluidic communication with the subsurface formation 20 and/or one or more subsurface regions 32.

Fractures 44 may be natural and/or manmade cracks, or surfaces of breakages, within rock in the subsurface formation 20. Fractures 44 may be induced mechanically in subsurface regions, for example, by hydraulic fracturing (in which case, the fracture 44 may be referred to as a hydraulic fracture). Another example of a method of forming of fractures 44 is steam fracturing (in which case, the fracture 44 may be referred to as a steam fracture). Fractures 44 may be referred to as hydraulic fractures and steam fractures, respectively. Fractures 44 may be substantially planar. Fractures 44 may be substantially vertical, substantially horizontal, any angle between vertical and horizontal, branched, networked, and combinations thereof, for example, a planar vertical fracture with a non-vertical branch. The length of a fracture 44 may be a distance from the source of the fracture (e.g., a wellbore 40 used to establish the fracture) to a fracture tip (the furthest point of the fracture from the source). Fractures 44 may be configured to be in electrical and/or fluidic communication with the subsurface formation 20 and/or one or more subsurface regions 32.

Fractures 44 may be held open with granular material called proppant. Fractures 44 may include and/or may be supported, lined, sealed, and/or filled with other materials, such as electrically conductive materials, particulate, granular materials, liquids, and/or gases. Electrically conductive materials may include at least one of granular material, granules, particles, filaments, metal, granular metal, metal coated particles, coke, graphite, electrically conductive gel, and electrically conductive liquid. For example, the proppant may include, and/or may be, graphite particles. As other examples, the proppant may include, and/or may be, an electrically conductive material, such as metal particles, metal coated particles, and/or coke particles.

Electrode assemblies 50 may be arranged in pairs of adjacent electrode assemblies 50. The pair of electrode assemblies 50 in each pair of adjacent electrode assemblies 50 may be nearer to each other than to other, non-adjacent electrode assemblies 50. Relative to a given electrode assembly 50, an adjacent electrode assembly 50 may be the closest electrode assembly 50 or one of the closest electrode assemblies 50. Pairs of adjacent electrode assemblies 50 are not necessarily within a small distance of each other and may be separated by distances of hundreds of meters. The distance between electrode assemblies 50 is the shortest distance between the electrode assemblies 50 through the subsurface region 32 that separates the electrode assemblies 50. Electrode assemblies 50 may be deemed adjacent when no other electrode assembly 50 intersects a line spanning the shortest distance between the electrode assemblies 50.

Electrode assemblies 50 may be arranged in pairs, groups, rows, columns, and/or arrays. The electrode assemblies 50 may be spaced apart and may have a substantially uniform spacing (at least in one direction). For example, electrode assemblies may be spaced apart with a spacing of at least 5 m, at least 10 m, at least 20 m, at least 50 m, at least 100 m, at least 200 m, at most 500 m, at most 200 m, at most 100 m, at most 50 m, and/or at most 20 m. Groups, rows, columns, and arrays of electrode assemblies 50 may include inside electrode assemblies 50 (also called middle electrode assemblies) and edge electrode assemblies 50 (also called end electrode assemblies). Edge electrode assemblies 50 may be adjacent and/or connected to fewer electrode assemblies 50 than inside electrode assemblies 50. For example, rows and columns of electrode assemblies 50 may include a first electrode assembly 50 at one end of the row or column and a last electrode assembly 50 at the other end of the row or column. The first electrode assembly 50 may be adjacent to only one electrode assembly 50; the last electrode assembly 50 may be adjacent to only one electrode assembly 50; and the middle electrode assemblies 50 may each be adjacent to two electrode assemblies 50 of the electrode assemblies in the row or column. The middle electrode assemblies 50 may be referred to as central electrode assemblies 50, intermediate electrode assemblies 50, and/or interior electrode assemblies 50.

Electrode assemblies 50 may be oriented with respect to each other. For example, two or more electrode assemblies 50 (or portions thereof) may be at least substantially parallel to each other and substantially facing each other. In particular, two electrode assemblies 50 may each include a generally planar fracture 44, and the fractures 44 of the electrode assemblies 50 may be substantially parallel to each other with each electrode assembly 50 including a face, or generally planar fracture surface, 46 that faces a corresponding face 46 of the other electrode assembly 50. In the example of FIG. 1, four substantially parallel fractures 44 each form a portion of four separate electrode assemblies 50. The four electrode assemblies 50 illustrated in FIG. 1 may be deemed parallel electrode assemblies 50.

Adjacent electrode assemblies 50 may be configured to transmit electricity and/or to electrically power the subsurface region(s) 32 between the adjacent electrode assemblies 50. The electrode assemblies 50 may be configured to apply a voltage across and/or to supply an electrical current through the corresponding subsurface region(s) 32. Electrical power supplied to the subsurface region(s) 32 may be DC (direct current) power and/or AC (alternating current) power. The electrical power may be supplied by an electrical power source 70.

DC power may be supplied by applying a voltage difference across the subsurface region 32. In a DC powered configuration, one of the electrode assemblies 50 contacting the subsurface region 32 may have a higher voltage (called the high voltage and/or the high polarity), and another electrode assembly 50 contacting the subsurface region 32 may have a lower voltage (called the low voltage and/or the low polarity). If the high polarity is a positive voltage and the low polarity is a negative voltage, the high polarity and the low polarity may be referred to as the positive polarity and the negative polarity, respectively. Where DC power is supplied, the voltages of the electrode assemblies 50 may be occasionally (e.g., periodically) switched, for example, to avoid electrochemical effects and electrode degradation at the electrode assemblies 50.

AC power may be supplied by applying different voltage waveforms (also called alternating voltages) to different electrode assemblies 50 in contact with the same subsurface region 32. Generally, the applied alternating voltages are periodic, have the same frequency, and have differing phase angles. Suitable AC frequencies include at least 10 Hz (hertz), at least 30 Hz, about 50 Hz, about 60 Hz, about 100 Hz, about 120 Hz, at least 100 Hz, at least 200 Hz, at least 1,000 Hz, at least 10,000 Hz, at most 100,000 Hz, at most 300,000 Hz, and/or at most 1,000,000 Hz. Suitable ranges may include combinations of any upper and lower AC frequency listed above or any number within or bounded by the AC frequencies listed above. The AC frequency may be selected to be below a frequency at which radio-frequency (induction) heating dominates over resistive (Joule) heating of the subsurface formation 20.

AC power may be supplied as one or more alternating voltages, and each electrode assembly 50 may have an alternating voltage or a DC voltage applied. For example, AC power may be supplied in a single-phase configuration where an alternating voltage is applied to one electrode assembly 50 and a DC voltage (also referred to as a neutral voltage) is applied to another electrode assembly 50. As other examples, AC power may be supplied in a two-phase configuration, a three-phase configuration, and/or in a multi-phase configuration. The 'electrical phases' available in a multi-phase configuration are alternating voltages having the same frequency and different phase angles (i.e., nonequal phase angles). Generally, the phase angles are relatively evenly distributed within the period of the AC power (the period is the inverse of the shared frequency of the alternating voltages). For example, common phase angles for a two-phase configuration are 0° and 180° (a phase angle difference of ±180°, i.e., of 180° in absolute value), and 0° and 120° (for example, two of the three poles from a 3-phase generator). Common phase angles for a three-phase configuration are 0°, 120°, and 240° (phase angle differences of ±120°, i.e., of 120° in absolute value). Though less common, other multi-phase configurations (e.g., 4, 5, 6, or more 'electrical phases') and/or other phase angles, and other phase angle differences, may be utilized to supply AC power.

When electrical power is supplied to subsurface regions 32, the subsurface regions 32 may resistively heat and become more electrically conductive. As the subsurface regions 32 are heated, the electrical conductivity may increase (and the electrical resistivity may decrease) due to physical and/or chemical changes within the subsurface regions 32, for example, due to temperature sensitivity of the electrical resistance of the native rock, due to native brine boiling off, and/or due to pyrolysis (and/or coking) of native organic matter and/or native hydrocarbons. Before heating, the subsurface regions 32 may be relatively poorly electrically conductive, for example, having an average electrical conductivity of less than 1 S/m (Siemens/meter), less than 0.1 S/m, less than 0.01 S/m, less than 0.001 S/m, less than $10^{-4}$ S/m, less than $10^{-5}$ S/m, less than $10^{-6}$ S/m, and/or within a range that includes or is bounded by any of the preceding examples of average electrical conductivity. Upon heating, the subsurface regions 32 may become more electrically conductive, achieving an average electrical conductivity of at least $10^{-5}$ S/m, at least $10^{-4}$ S/m, at least $10^{-3}$ S/m, at least 0.01 S/m, at least 0.1 S/m, at least 1 S/m, at least 10 S/m, at least 100 S/m, and/or within a range that includes or is bounded by any of the preceding examples of average electrical conductivity.

Where electrical conduction and/or resistive heating is not uniform within subsurface region 32, a subsurface shunt may form between electrode assemblies 50 that serve the subsurface region 32. An example of such a subsurface shunt is schematically illustrated in FIG. 1 at 60. The subsurface shunt 60 may form because electrical conductivity increases with increasing temperature and/or may form due to inhomogeneities (such as electrically-conductive and/or fluidically-conductive regions) within the subsurface region 32. The subsurface shunt 60 may be a region, a pathway, and/or a channel that extends between two electrode assemblies 50 within the subsurface region 32, and which has a higher electrical conductivity than the rest of the subsurface region 32. Subsurface shunts 60 may be electrical shorts between electrode assemblies 50. Subsurface shunts 60 may divert electrical current supplied by the electrode assemblies 50 away from the bulk of the subsurface regions 32 and into the subsurface shunts 60. Subsurface shunts 60 may be, and/or may include, a fluid path between electrode assemblies 50. Subsurface shunts 60 may transmit fluid injected into one electrode assembly 50 to another, connected, electrode assembly 50.

When subsurface shunts 60 become sufficiently electrically conductive, the majority of electrical current passing between the electrode assemblies 50 may travel through the subsurface shunts 60. The positive correlation between temperature and electrical conductivity may reinforce and/or concentrate the subsurface shunts 60 as electrical current flows through. Subsurface shunts 60 may be very small as compared to the corresponding subsurface regions 32. The electrical current and the consequent heating may be very highly concentrated within the subsurface shunts 60.

The average electrical conductivity of subsurface shunts 60 may be at least $10^{-5}$ S/m, at least $10^{-4}$ S/m, at least $10^{-3}$ S/m, at least 0.01 S/m, at least 0.1 S/m, at least 1 S/m, at least 10 S/m, at least 100 S/m, at least 300 S/m, at least 1,000 S/m, at least 3,000 S/m, at least 10,000 S/m, and/or within a range that includes or is bounded by any of the preceding examples of average electrical conductivity. The electrical conductivity of subsurface shunts 60 may be so great, relative to the remainder of the corresponding subsurface regions 32, that the average electrical conductivity of the subsurface regions 32 may be dominated by the average electrical conductivity of the included subsurface shunts 60.

Figure 2:
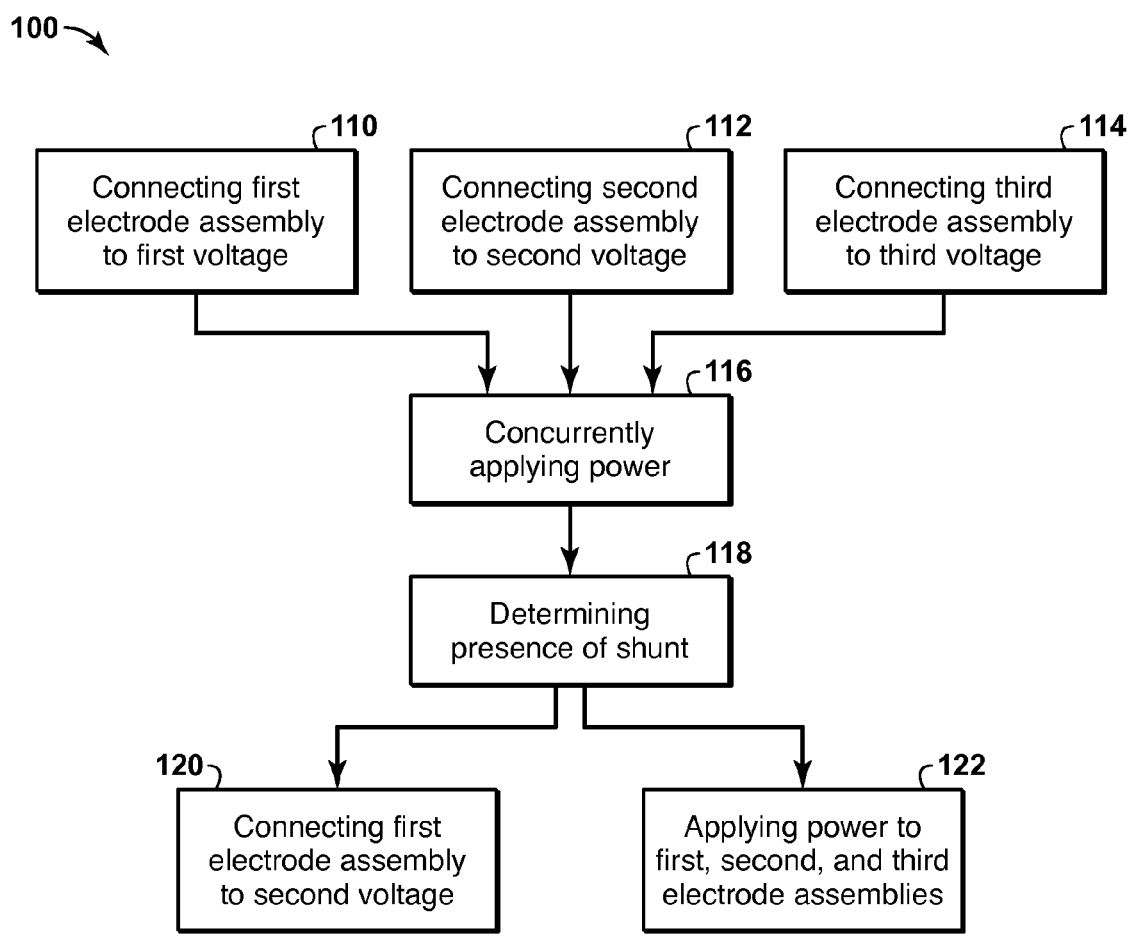
FIG. 2 is a schematic representation of bulk heating methods that are responsive to subsurface shunt formation.

The effects of subsurface shunts 60 may be mitigated during bulk heating of subsurface formations 20 by performing bulk heating methods 100. In the example of FIG. 2, bulk heating methods 100 may comprise operating at least three electrode assemblies (such as electrode assemblies 50) that are within a subsurface formation (such as subsurface formation 20), to heat at least two in situ resistive heaters (such as in situ resistive heaters 34) between the at least three electrode assemblies. The electrode assemblies may include two pairs of adjacent electrode assemblies that correspond to the two in situ resistive heaters.

Bulk heating methods 100 of FIG. 2 may comprise electrically connecting 110 a first electrode assembly of the at least three electrode assemblies to a first alternating voltage, electrically connecting 112 a second electrode assembly of the at least three electrode assemblies to a second alternating voltage, and electrically connecting 114 a third electrode assembly of the at least three electrode assemblies to a third alternating voltage. The first alternating voltage, the second alternating voltage, and the third alternating voltage may have the same frequency and different phase angles (i.e., nonequal phase angles), and, hence, may be referred to as different alternating voltages and/or different voltages. The phase angle of the first, second, and third alternating voltages may be referred to as the first, second, and third phase angles, respectively. The first phase angle may be different than the second phase angle and, hence, electrical current may flow through a first subsurface region (e.g., a first subsurface region 32) between the first electrode assembly and the second electrode assembly. The first subsurface region may be referred to as a first in situ resistive heater (e.g., a first in situ resistive heater 34). The third phase angle may be different than the second phase angle and, hence, electrical current may flow through a second subsurface region (e.g., a second subsurface region 32) between the second electrode assembly and the third electrode assembly. The second subsurface region may be referred to as a second in situ resistive heater (e.g., a second in situ resistive heater 34). Though the second phase angle may be different from both the first phase angle and the third phase angle, the first phase angle and the third phase angle may be the same (in which case the first alternating voltage and third alternating voltage would be the same).

Where electrical current flows through a pair of electrode assemblies and through the corresponding in situ resistive heater, the pair of electrode assemblies and the corresponding in situ resistive heater may form an electrical circuit.

Though electrical connections are described in terms of connecting alternating voltages with different phases, bulk heating methods 100 may be performed with DC voltages and/or with differing polarities.

Figure 3:
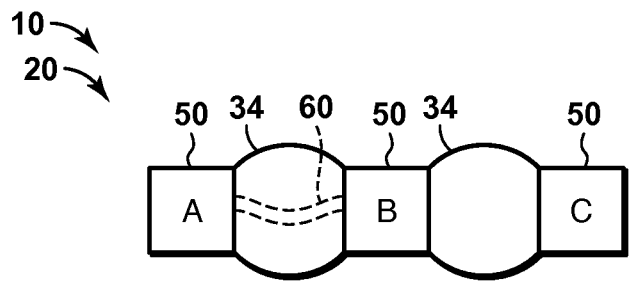
FIG. 3 is a schematic representation of an example of a plurality of powered electrode assemblies before and/or during subsurface shunt formation.

The physical arrangement and electrical connections of the example bulk heating methods 100 of FIG. 2 are schematically represented in FIG. 3. In FIG. 3, three electrode assemblies 50 are represented as boxes even though each may be an extended structure as described herein (e.g., wellbores and/or fractures). The first alternating voltage with the first phase angle is represented with an "A" within the box of the electrode assembly 50 at the left. The second alternating voltage with the second phase angle is represented with a "B" within the box of the electrode assembly 50 in the middle. The third alternating voltage with the third phase angle is represented with a "C" within the box of the electrode assembly 50 at the right. Two in situ resistive heaters 34 are located between the three electrode assemblies 50, with first in situ resistive heater 34 extending between the first and second electrode assemblies, and second in situ resistive heater 34 extending between the second and third electrode assemblies.

Returning to the methods of the example of FIG. 2, bulk heating methods 100 may comprise concurrently applying electrical power 116 to the first and second in situ resistive heaters, i.e., concurrently applying the first, second, and third alternating voltages to the first, second, and third electrode assemblies, respectively. Concurrently applying electrical power 116 may include heating at least one of the first and the second in situ resistive heaters. The heating may include pyrolyzing organic matter in the subsurface formation, pyrolyzing organic matter to create hydrocarbon fluids, and/or mobilizing hydrocarbon fluids within the subsurface formation. The heating may include heating at least one of the first subsurface region, the first in situ resistive heater, the second subsurface region, and the second in situ resistive heater to an average temperature and/or a point (localized) temperature of at least 150° C., at least 250° C., at least 350° C., at least 450° C., at least 550° C., at least 700° C., at least 800° C., at least 900° C., at most 1000° C., at most 900° C., at most 800° C., at most 700° C., at most 550° C., at most 450° C., at most 350° C., at most 270° C., and/or within a range that includes or is bounded by any of the preceding examples of temperature.

Concurrently applying electrical power 116 to the first and second in situ resistive heaters may result in a subsurface shunt (e.g., a subsurface shunt 60) forming within one of the in situ resistive heaters and between two of the electrode assemblies. Hence, bulk heating methods 100 may include determining 118 the presence of a subsurface shunt within one of the in situ resistive heaters and between two of the electrode assemblies. For example, bulk heating methods 100 may include determining 118 the presence of the subsurface shunt in the first in situ resistive heater and between the first electrode assembly and the second electrode assembly. Determining 118 may include, and/or bulk heating methods 100 may include, measuring an electrical conductivity-related parameter between two electrode assemblies (e.g., the first and the second electrode assemblies). The electrical conductivity-related parameter may include, and/or may be, at least one of conductivity, conductance, resistivity, resistance, current, voltage, and temperature.

Determining 118 may include determining that the electrical conductivity-related parameter is greater than, less than, and/or about equal to a predetermined threshold that may represent the presence and/or formation of a subsurface shunt. Determining 118 may include determining that the rate of change of the electrical conductivity-related parameter is greater than, less than, and/or about equal to a predetermined threshold rate of change that may represent the presence and/or formation of a subsurface shunt. Determining 118 may include determining that an average electrical conductivity of one or more of the subsurface regions (and/or one or more of the in situ resistive heaters) is at least $10^{-5}$ S/m, at least $10^{-4}$ S/m, at least $10^{-3}$ S/m, at least 0.01 S/m, at least 0.1 S/m, at least 1 S/m, at least 10 S/m, at least 100 S/m, at least 300 S/m, at least 1,000 S/m, at least 3,000 S/m, at least 10,000 S/m, and/or within a range that includes or is bounded by any of the preceding examples of average electrical conductivity. Determining 118 may include determining that an average electrical conductivity of the subsurface shunt is at least $10^{-5}$ S/m, at least $10^{-4}$ S/m, at least $10^{-3}$ S/m, at least 0.01 S/m, at least 0.1 S/m, at least 1 S/m, at least 10 S/m, at least 100 S/m, at least 300 S/m, at least 1,000 S/m, at least 3,000 S/m, at least 10,000 S/m, and/or within a range that includes or is bounded by any of the preceding examples of average electrical conductivity.

Upon determining 118 that a subsurface shunt is present within an in situ resistive heater and between two electrode assemblies, bulk heating methods 100 may comprise connecting both electrode assemblies affected by the subsurface shunt to the same voltage (e.g., alternating voltages with the same magnitude, frequency, and phase angle, and/or DC voltages with the same magnitude and polarity) while connecting the remaining electrode assemblies to voltages configured to continue heating in the unaffected in situ resistive heaters.

Figure 4:
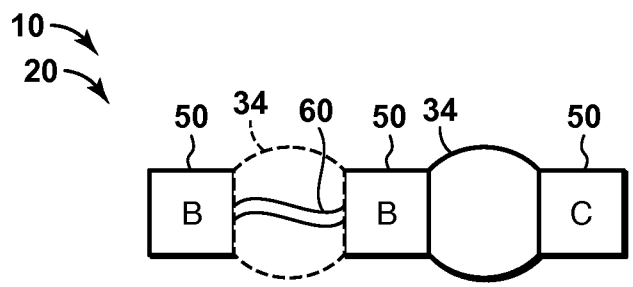
FIG. 4 is a schematic representation of the system of FIG. 3 after the effect of the subsurface shunt is mitigated.

Upon determining the presence of a subsurface shunt between the first electrode assembly and the second electrode assembly, bulk heating methods 100 may comprise electrically connecting 120 the first electrode assembly and the second electrode assembly to the second alternating voltage while applying 122 the second alternating voltage to the second electrode assembly and the third alternating voltage to the third electrode assembly to continue electrically powering, and heating, the second in situ resistive heater. Power may be supplied to the first electrode assembly to continue heating any associated in situ resistive heaters other than the first in situ resistive heater. The physical arrangement and electrical connections of the foregoing example are schematically represented in FIG. 4. In FIG. 4, the subsurface shunt 60 has formed and affects the current flow between two connected electrode assemblies 50 (i.e., the two affected electrode assemblies 50). Hence, heating of the entire in situ resistive heater 34 (shown in dashed line) that includes the subsurface shunt 60 may not be desirable and/or feasible. However, the other in situ resistive heater 34 (shown in solid line) may be heated, and/or may continue to be heated because the subsurface shunt 60 does not affect the other in situ resistive heater 34. To avoid the effects of the subsurface shunt 60, conventional methods of bulk heating would disable at least one of the electrode assemblies 50 affected by the subsurface shunt 60. Instead, bulk heating methods 100 keep both affected electrode assemblies 50 energized with the same voltage, as indicated by the "B" (second alternating voltage) in the boxes representing affected electrode assemblies 50. The unaffected in situ resistive heater 34 is electrically powered because the two electrode assemblies that serve the unaffected in situ resistive heater 34 have different voltages applied, as indicated by the "B" (second alternating voltage) in the box representing the middle electrode assembly 50 and the "C" (third alternating voltage) in the box representing the right electrode assembly 50.

Figure 5:
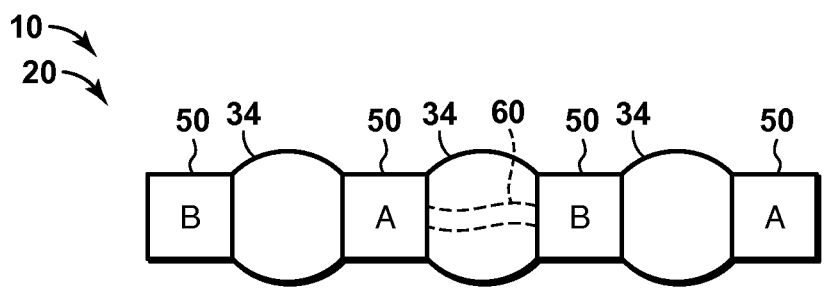
FIG. 5 is a schematic representation of an example of a plurality of powered electrode assemblies before and/or during subsurface shunt formation.
Figure 6:
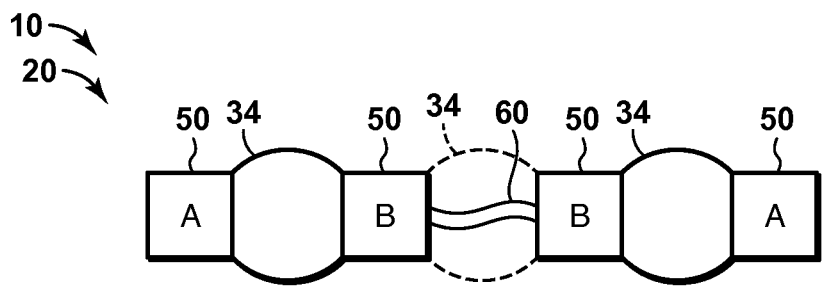
FIG. 6 is a schematic representation of the system of FIG. 5 after the effect of the subsurface shunt is mitigated.

FIGS. 5 and 6 illustrate a similar scenario in which the subsurface formation 20 includes at least four electrode assemblies 50 and at least three in situ heaters 34 between pairs of the electrode assemblies 50. Initially, as seen in FIG. 5, two different voltages are selectively applied (indicated as "A" and "B") to the electrode assemblies 50 such that each pair of electrode assemblies 50 includes each of the two different applied voltages. Thus, each in situ resistive heater is electrically powered by the respective electrode assembly pairs. If a subsurface shunt 60 forms between the middle two electrode assemblies 50, the middle in situ resistive heater 34 may be affected and, therefore, may no longer be desirable and/or feasible to continue electrically powering. As seen in FIG. 6, and analogous to the example illustrated in FIGS. 3 and 4, the affected electrode assemblies 50 may have the same voltage applied. In FIG. 6, the middle two electrode assemblies 50 (which are affected by the subsurface shunt 60) have the "B" voltage applied. Hence, the left middle electrode assembly 50 has switched from the voltage "A" (in FIG. 5) to the voltage "B" (in FIG. 6). To continue to electrically power as many of the unaffected in situ heaters 34 as possible, the leftmost electrode assembly 50 has a new voltage applied as well, i.e., the voltage "B" (in FIG. 5) is switched to the voltage "A" (in FIG. 6).

More generally, FIGS. 5 and 6 illustrate a bulk heating method 100 in which at least four electrode assemblies 50 are connected to at least two different voltages to form at least three in situ resistive heaters 34 between pairs of the electrode assemblies 50. The three in situ resistive heaters 34 may be concurrently electrically powered. Upon determining that a subsurface shunt 60 is present between two of the electrode assemblies 50, the two affected electrode assemblies 50 are switched to the same voltage, and the remaining electrode assemblies 50 have a voltage applied that will electrically power the unaffected in situ resistive heaters 34.

Figure 7:
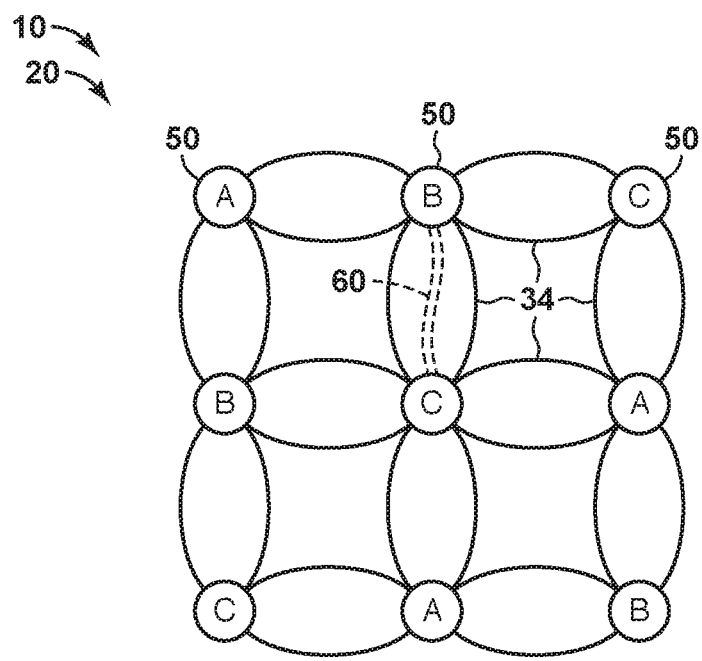
FIG. 7 is a schematic representation of an example of a plurality of powered electrode assemblies before and/or during subsurface shunt formation.
Figure 8:
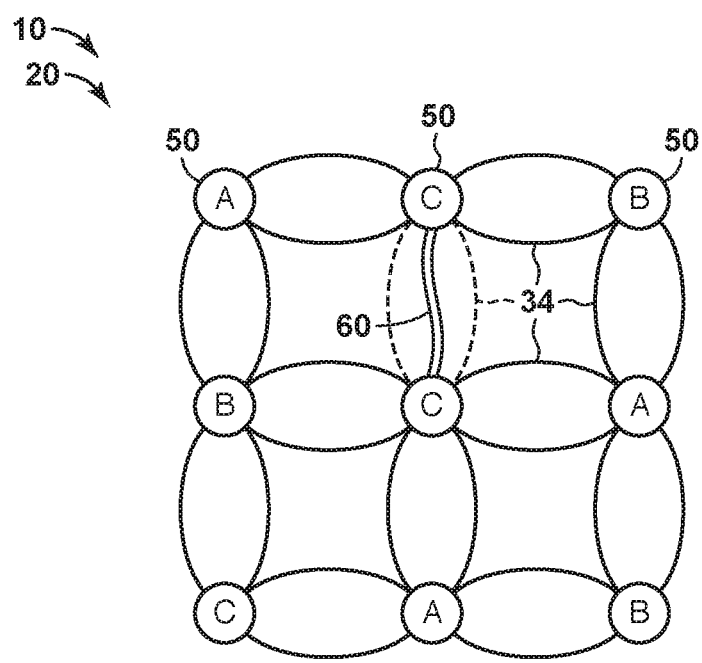
FIG. 8 is a schematic representation of the system of FIG. 7 after the effect of the subsurface shunt is mitigated.

FIGS. 7 and 8 illustrate an array of electrode assemblies 50 within a subsurface formation 20. The electrode assemblies 50 may be generally adjacent to at least two other electrode assemblies 50. As with FIGS. 3 and 4, and FIGS. 5 and 6, each pair of adjacent electrode assemblies 50 is connected in an electrical circuit by applying different voltages to each electrode assembly 50 in the pair. The electrical circuits include the in situ resistive heaters 34 between the pairs of electrode assemblies 50. That is, electricity (e.g., electrical current), supplied by each pair of electrode assemblies 50, flows through the corresponding in situ resistive heaters 34 and resistively heats the in situ resistive heaters 34. Upon determining that a subsurface shunt 60 is present between two affected electrode assemblies 50, the same voltage is applied to both of the affected electrode assemblies 50, as seen in FIG. 8. The application of the same voltage to the affected electrode assemblies 50 ceases electrical power flow through the subsurface shunt 60. To maintain electrical power flow in the remaining, unaffected in situ resistive heaters 34, the applied voltages may be rearranged. In FIG. 7, the two electrode assemblies 50 that will be affected by the subsurface shunt 60 (as indicated by the dashed line subsurface shunt) have voltages "B" and "C" applied. After formation of the subsurface shunt, as seen in FIG. 8, the two affected electrode assemblies 50 both have voltage "C" applied. To maintain the remaining, unaffected in situ resistive heaters 34, the voltage applied to the upper right electrode assembly 50 is switched from voltage "C" (in FIG. 7) to voltage "B" (in FIG. 8).

In FIGS. 7 and 8, electricity may flow between any adjacent electrode assemblies 50 with different voltages applied. For example, diagonally-disposed electrode assemblies 50 in FIGS. 7 and 8 that have different voltages applied may form electrical circuits with in situ resistive heaters between the diagonally—disposed electrode assemblies 50. As a particular example, the central electrode assembly 50 in FIGS. 7 and 8, which has voltage "C" applied to it, may form an electrical circuit with the upper left electrode assembly 50, which has voltage "A" applied to it. As a result, an in situ resistive heater may be formed between the diagonally-disposed electrode assemblies 50. For the purpose of simplifying FIGS. 7 and 8, the potential electrical circuits and in situ resistive heaters between diagonally-disposed electrode assemblies with different applied voltages have not been illustrated in FIGS. 7 and 8.

Figure 9:
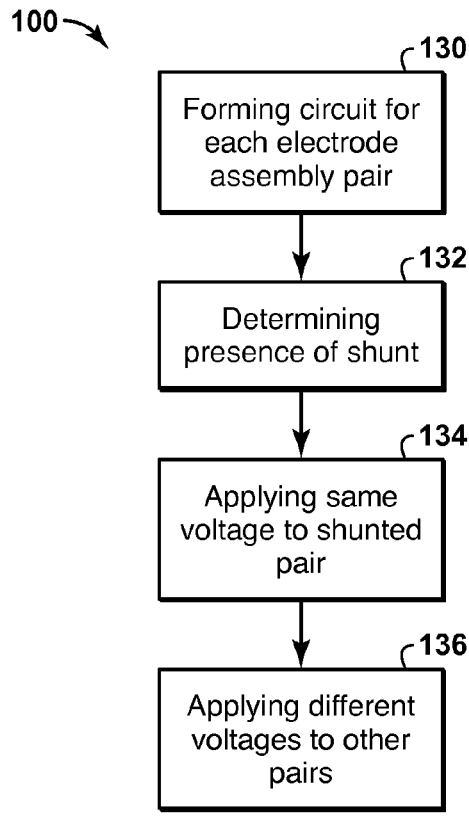
FIG. 9 is a schematic representation of bulk heating methods that form circuits with pairs of electrode assemblies.

FIG. 9 schematically represents a bulk heating method 100. In the example of FIG. 9, bulk heating method 100 comprises operating a group of electrode assemblies (such as an array, a row, and/or a column of electrode assemblies). The group of electrode assemblies may be arranged such that at least one electrode assembly (e.g., an inside electrode assembly) is adjacent to at least two other electrode assemblies. Therefore, at least one electrode assembly (e.g., an inside electrode assembly) contributes to at least two pairs of adjacent electrode assemblies and may be utilized to electrically power at least two subsurface regions. Some electrode assemblies of the group may be edge electrode assemblies and/or end electrode assemblies and may contribute to fewer pairs of adjacent electrode assemblies than the inside electrode assembly or assemblies. For example, an end electrode assembly may be adjacent to only one other electrode assembly and therefore may contribute to only one pair of adjacent electrode assemblies.

In FIG. 9, bulk heating method 100 may comprise forming 130 an electrical circuit for each pair of adjacent electrode assemblies by applying different voltages to each electrode assembly in the pair. The electrical circuits may include flowing electricity through the subsurface regions between the pairs of adjacent electrode assemblies and thereby resistively heating the subsurface regions. Upon determining 132 the presence of a subsurface shunt between one of the pairs of adjacent electrode assemblies, bulk heating methods 100 may comprise applying 134 the same voltage to both electrode assemblies of the pair of electrode assemblies affected by the subsurface shunt and applying 136 different voltages to the electrode assemblies of each pair of the remaining (unaffected) adjacent electrode assemblies. The pair of electrode assemblies affected by the subsurface shunt may be referred to as the pair of affected electrode assemblies and/or the pair of shunted electrode assemblies.

Figure 10:
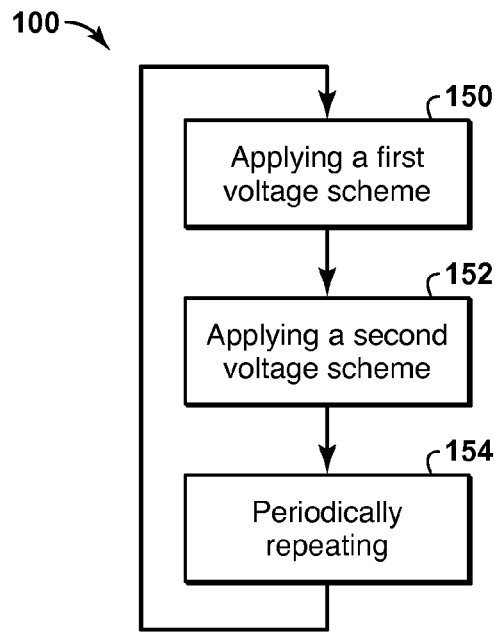
FIG. 10 is a schematic representation of bulk heating methods that include proactive voltage switching.

In FIG. 10, bulk heating methods 100 may be adapted to proactively switch voltages applied to electrode assemblies and thus may be utilized to avoid or delay the formation of subsurface shunts. Generally, the bulk heating methods 100 of FIG. 10 apply to groups of electrode assemblies that are spaced apart, with most (and optionally all) of the electrode assemblies contributing to at least two pairs of adjacent electrode assemblies. For example, the electrode assemblies may be arranged in two rows (e.g., two rows of parallel fractures containing electrically conductive material), with each electrode assembly of one of the rows having two closest electrode assemblies (i.e., two adjacent electrode assemblies) in the other row. The groups of electrode assemblies additionally or alternatively may be referred to as arrays and/or series of electrode assemblies. Each subset of one electrode assembly from one row and the two closest electrode assemblies from the other row may be referred to as a triad and/or a triad of electrode assemblies. Where the electrode assemblies include extended structures such as fractures, the electrode assemblies may be arranged such that the electrode assemblies of one row do not extend into the other row and/or between the electrode assemblies of the other row. In other words, the two rows may be spaced-apart rows.

As shown in FIG. 10, bulk heating methods 100 may comprise applying 150 a first voltage scheme, then applying 152 a second voltage scheme, and then periodically repeating 154 the applying 150 and 152 of the first and second voltage schemes. The first voltage scheme and the second voltage scheme are arrangements of applied voltages for each triad of an electrode assembly of one row (referred to as the central electrode assembly) and the corresponding two closest electrode assemblies of the other row (referred to as the first and second adjacent electrode assemblies). In the first voltage scheme, for each triad, the same voltage (e.g., alternating voltages with the same phase angles) is applied to the central electrode assembly and the first adjacent electrode assembly, and a different voltage (e.g., an alternating voltage with a different phase angle) is applied to the second adjacent electrode assembly. Because different voltages are applied to the central electrode assembly and the second adjacent electrode assembly, the subsurface region between the central electrode assembly and the second adjacent electrode assembly may be resistively heated. In the second voltage scheme, for each triad, the same voltage is applied to the central electrode assembly and the second adjacent electrode assembly, and a different voltage is applied to the first adjacent electrode assembly. Because different voltages are applied to the central electrode assembly and the first adjacent electrode assembly, the subsurface region between the central electrode assembly and the first adjacent electrode assembly may be resistively heated.

Figure 11:
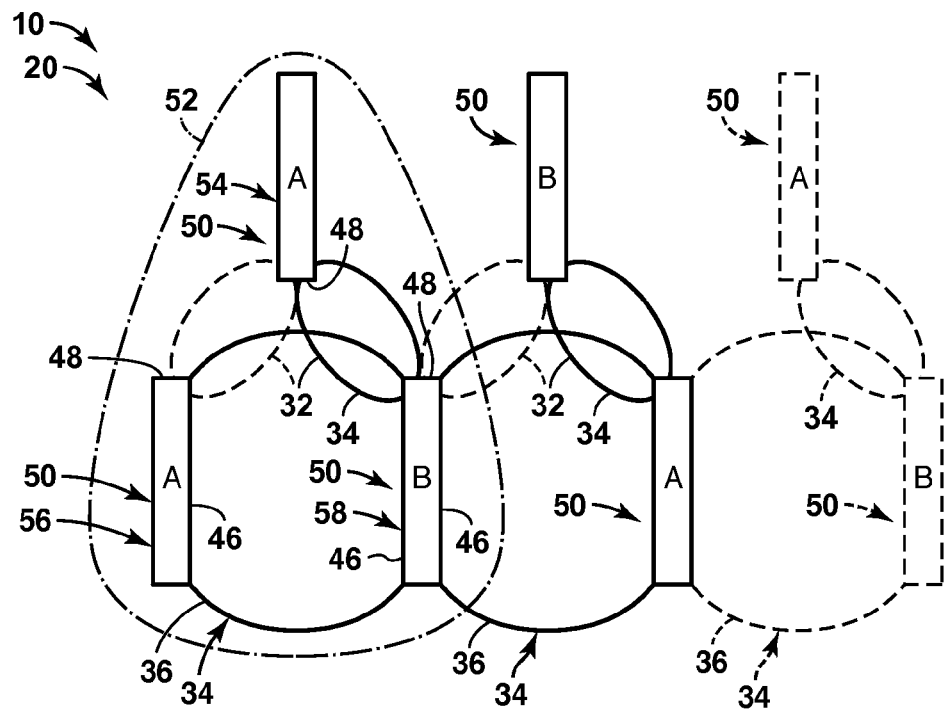
FIG. 11 is a schematic representation of an example of a plurality of powered electrodes with a first voltage scheme applied.
Figure 12:
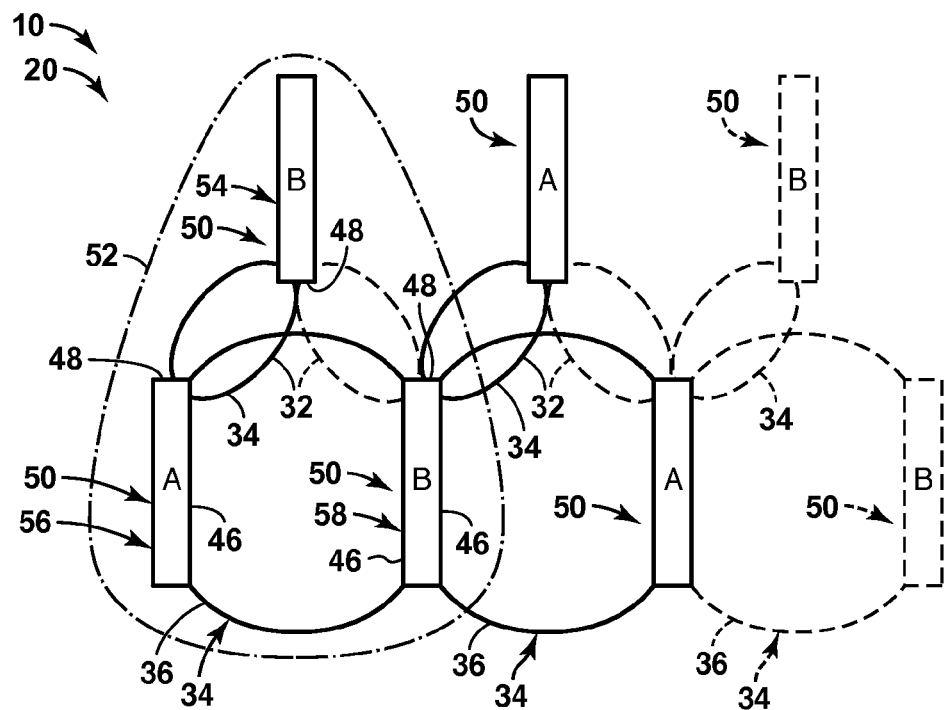
FIG. 12 is a schematic representation of the system of FIG. 11 with a second voltage scheme applied.

FIGS. 11 and 12 illustrate an arrangement of electrode assemblies 50 in which the first voltage scheme is applied (FIG. 11) and in which the second voltage scheme is applied (FIG. 12). FIGS. 11 and 12 depict a top view of two rows of vertical fracture electrode assemblies 50. For illustration purposes, the widths of the fractures are exaggerated compared to the length of the fractures. Fracture widths may be on order of a few millimeters or centimeters whereas fracture lengths may be on order of tens or hundreds of meters. It may be desired to electrically heat the regions between adjacent electrode assemblies 50 in a row by electrically powering in-row in situ resistive heaters 36. In-row in situ resistive heaters 36 are in situ resistive heaters 34 that are between adjacent electrode assemblies 50 of a row. For illustration purposes, in situ resistive heaters are depicted via example electrical flow lines between adjacent electrode assemblies. It understood that electricity flow is occurring over the entire exposed surface of an electrode assembly and not just where flow lines are shown. However, when utilizing more than one row of electrode assemblies 50, the shortest electrical pathway between electrode assemblies 50 may not be between the adjacent electrode assemblies 50 in a row. Instead, the tips 48 of the electrode assemblies 50 of one row may be closer to the tips 48 of the electrode assemblies 50 of another row than the spacing between adjacent electrode assemblies 50 in the row. Hence, electrical current may substantially or dominantly flow between the tips 48 of the electrode assemblies 50 and thus through the in situ resistive heaters 34 formed between the tips 48 of the electrode assemblies 50. The substantial or dominant current flow may lead to a subsurface shunt 60 forming between the tips 48 of the electrode assemblies 50.

For clarity, in FIGS. 11 and 12, only one triad 52 of electrode assemblies 50 is indicated by a dot-dash line. An arrangement of electrode assemblies 50 may include more than one triad 52. In the first voltage scheme (FIG. 11), the central electrode assembly 54 and the first adjacent electrode assembly 56 have voltage "A" applied. Hence, no electrical circuit is formed between the tip 48 of the central electrode assembly 54 and the tip 48 of the first adjacent electrode assembly 56. The second adjacent electrode assembly 58 has voltage "B" applied. Because voltage "B" is different than voltage "A," electrical power may flow in a circuit between the tip 48 of the central electrode assembly 54 and the tip 48 of the second adjacent electrode assembly 58. Thus, the subsurface region 32 between the tip 48 of the central electrode assembly 54 and the tip 48 of the second adjacent electrode assembly 58 may be energized to become the in situ resistive heater 34. The subsurface region 32 between the tip 48 of the central electrode assembly 54 and the tip 48 of the first adjacent electrode assembly 56 is not energized (and not heated). Because the first adjacent electrode assembly 56 has a different voltage applied (voltage "A") than the second adjacent electrode assembly 58 (which has voltage "B" applied), the in-row in situ resistive heater 36 between the first adjacent electrode assembly 56 and the second adjacent electrode assembly 58 may be energized and heated.

In the second voltage scheme (FIG. 12), the central electrode assembly 54 and the second adjacent electrode assembly 58 have voltage "B" applied. Hence, no electrical circuit is formed between the tip 48 of the central electrode assembly 54 and the tip 48 of the second adjacent electrode assembly 58. The first adjacent electrode assembly 56 has voltage "A" applied. Because voltage "A" is different than voltage "B," electrical power may flow in a circuit between the tip 48 of the central electrode assembly 54 and the tip 48 of the first adjacent electrode assembly 56. Thus, the subsurface region 32 between the tip 48 of the central electrode assembly 54 and the tip 48 of the first adjacent electrode assembly 56 may be energized to become the in situ resistive heater 34. The subsurface region 32 between the tip 48 of the central electrode assembly 54 and the tip 48 of the second adjacent electrode assembly 58 is not energized (and not heated). However, the in-row in situ resistive heater 36 between the first adjacent electrode assembly 56 and the second adjacent electrode assembly 58 may be, and/or may remain, energized and heated.

By periodically repeating 154 the application of the first voltage scheme and the second voltage scheme, the subsurface region 32 that is heated will be periodically changed, and the opportunity to form a subsurface shunt between the tips 48 of adjacent electrode assemblies 50 may be lessened. The periodic application of different voltage schemes may allow rows of electrode assemblies 50 to be placed closer together than the spacing between electrode assemblies 50 within a row. Hence, a dense field of in situ resistive heaters 34 may be utilized to heat the subsurface formation 20 while avoiding or delaying subsurface shunt formation.

Examples of the frequency for the periodically repeating 154 include at least once every 1 day, at least once every 10 days, at least once every 30 days, at least once every 60 days, and/or at least once every 90 days.

The bulk heating methods 100 may comprise producing hydrocarbon fluids from the subsurface formation. The hydrocarbon fluids may be produced to a surface (e.g., surface 22) via a production well in the subsurface formation. The production well may be proximate to one or more of the electrode assemblies. The production well may be in fluid communication with one or more subsurface regions.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific systems and methods that are expressly disclosed herein, and such inventive subject matter may find utility in systems and/or methods that are not expressly disclosed herein.

In the present disclosure, several examples have been discussed and/or presented in the context of flow diagrams, or flow charts, in which the methods are shown and described as a series of blocks, or steps. Unless specifically set forth in the accompanying description, the order of the blocks may vary from the illustrated order in the flow diagram, including with two or more of the blocks (or steps) occurring in a different order and/or concurrently.

INDUSTRIAL APPLICABILITY

The systems and methods of the present disclosure are applicable to the oil and gas industry.

It is believed that the following claims particularly point out certain combinations and subcombinations that are novel and non-obvious. Other combinations and subcombinations of features, functions, elements and/or properties may be claimed through amendment of the present claims or presentation of new claims in this or a related application. Such amended or new claims, whether different, broader, narrower, or equal in scope to the original claims, are also regarded as included within the subject matter of the present disclosure.

The invention claimed is:

1. A method of bulk heating of a subsurface formation with a first electrode assembly in the subsurface formation, a second electrode assembly in the subsurface formation, and a third electrode assembly in the subsurface formation, the method comprising:

electrically connecting the first electrode assembly to a first alternating voltage having a frequency and a first phase angle;

electrically connecting the second electrode assembly to a second alternating voltage having the frequency and a second phase angle different from the first phase angle and forming a first in situ resistive heater in a first subsurface region between the first electrode assembly and the second electrode assembly;

electrically connecting the third electrode assembly to a third alternating voltage having the frequency and a third phase angle different from the second phase angle and forming a second in situ resistive heater in a second subsurface region between the second electrode assembly and the third electrode assembly;

concurrently applying the first, second, and third alternating voltages to the first, second, and third electrode assemblies, respectively; and upon determining a presence of a subsurface shunt between the first electrode assembly and the second electrode assembly, electrically connecting the first electrode assembly to the second alternating voltage and applying the second alternating voltage to the first and second electrode assemblies while applying the third alternating voltage to the third electrode assembly.

2. The method of claim 1, wherein the third phase angle is the same as the first phase angle.

3. The method of claim 1, wherein the determining includes measuring a parameter related to electrical conductivity between the first electrode assembly and the second electrode assembly, wherein the parameter is at least one of conductivity, conductance, resistivity, resistance, current, voltage, and temperature.

4. The method of claim 1, wherein the determining includes determining that an average conductivity of the first subsurface region is at least 0.01 S/m.

5. The method of claim 1, wherein the subsurface formation includes a fourth electrode assembly and the method further comprises electrically connecting the fourth electrode assembly to a fourth alternating voltage having the frequency and a fourth phase angle different from the first phase angle and forming a third in situ resistive heater in a third subsurface region between the first electrode assembly and the fourth electrode assembly; and wherein the concurrently applying includes concurrently applying the first, second, third, and fourth alternating voltages to the first, second, third, and fourth electrode assemblies, respectively.

6. The method of claim 5, wherein the fourth phase angle is equal to the second phase angle, and the method further comprises, upon determining the presence of the subsurface shunt between the first electrode assembly and the second electrode assembly, electrically connecting the fourth electrode assembly to an alternating voltage having the frequency and a phase angle different than the second phase angle.

7. The method of claim 5, wherein the fourth phase angle is equal to the second phase angle, and the method further comprises, upon determining the presence of the subsurface shunt between the first electrode assembly and the second electrode assembly, electrically connecting the fourth electrode assembly to an alternating voltage selected from the group consisting of the first alternating voltage and the third alternating voltage.

8. The method of claim 5, wherein the fourth electrode assembly is adjacent to the first electrode assembly.

9. The method of claim 1, wherein the first electrode assembly includes a first fracture, the second electrode assembly includes a second fracture, and the third electrode assembly includes a third fracture, and wherein the first fracture, the second fracture, and the third fracture are parallel to each other.

10. The method of claim 1, wherein the second electrode assembly is adjacent to the first electrode assembly, and wherein the third electrode assembly is adjacent to the second electrode assembly.

11. A method of bulk heating a subsurface formation with a row of electrode assemblies in the subsurface formation, wherein the row of electrode assemblies includes a first electrode assembly at one end of the row and a last electrode assembly at another end of the row, and wherein each electrode assembly in the row of electrode assemblies, except the first electrode assembly and the last electrode assembly, forms a pair of adjacent electrode assemblies with each of two adjacent electrode assemblies in the row, the method comprising:
  forming an electrical circuit for each of the pair of adjacent electrode assemblies by applying alternating voltages with a same frequency and nonequal phase angles to the electrode assemblies in the pair of adjacent electrode assemblies, wherein the electrical circuit includes flowing electricity through a subsurface region of the subsurface formation between the pair of adjacent electrode assemblies and resistively heating the subsurface region; and
  upon determining a presence of a subsurface shunt between one of the pairs of adjacent electrode assemblies, applying alternating voltages with the same frequency and equal phase angles to the electrode assemblies in the one of the pairs of adjacent electrode assemblies, and, for each other pair of adjacent electrode assemblies, applying alternating voltages with the same frequency and nonequal phase angles to the electrode assemblies in the other pair.

12. The method of claim 11, wherein each electrode assembly of the row of electrode assemblies includes a fracture and wherein the fractures of the electrode assemblies are parallel to each other.

13. The method of claim 11, wherein the determining includes measuring a parameter related to electrical conductivity between the electrode assemblies of the one of the pairs of adjacent electrode assemblies, and wherein the parameter is at least one of conductivity, conductance, resistivity, resistance, current, voltage, and temperature.

14. The method of claim 11, wherein the determining includes determining that an average conductivity of the subsurface region between the electrode assemblies of the one of the pairs of electrode assemblies is at least 0.01 S/m.

15. A method of bulk heating of a subsurface formation with a first row of parallel fractures and a second row of parallel fractures, each fracture including electrically conductive material, wherein the first row is parallel to the second row, wherein the fractures of the first row do not extend in between the fractures of the second row, and the fractures of the second row do not extend in between the fractures of the first row, and wherein each fracture of the second row has two closest fractures in the first row, the method comprising:
  (a) for each fracture of the second row and the corresponding two closest fractures in the first row, applying an alternating voltage with a same frequency and a first phase angle to the fracture of the second row and to a first fracture of the two closest fractures in the first row, and applying an alternating voltage with the same frequency and a second phase angle to a second fracture of the two closest fractures in the first row to resistively heat a first subsurface region between the fracture of the second row and the second fracture of the two closest fractures;
  (b) then, for each fracture of the second row and the corresponding two closest fractures in the first row, applying an alternating voltage with the same frequency and a third phase angle to the fracture of the second row and to the second fracture of the two closest fractures in the first row, and applying an alternating voltage with the same frequency and a fourth different phase angle to the first fracture of the two closest fractures in the first row to resistively heat a second subsurface region between the fracture of the second row and the first fracture of the two closest fractures; and
  (c) periodically repeating step (a) and then step (b).

16. The method of claim 15, wherein the third phase angle is the same as the second phase angle and the fourth phase angle is the same as the first phase angle.

17. The method of claim 15, wherein step (a) includes applying alternating voltages with unequal phase angles to adjacent fractures of the second row, and wherein step (b) includes applying alternating voltages with unequal phase angles to adjacent fractures of the second row.

18. The method of claim 15, wherein the periodically repeating is performed at most once every day.

* * * * *